United States Patent
Belling et al.

(10) Patent No.: US 10,075,479 B2
(45) Date of Patent: Sep. 11, 2018

(54) METHOD FOR ESTABLISHING A VIDEO TELEPHONE CONNECTION AND/OR A MULTIMEDIA TELEPHONE CONNECTION IN A DATA NETWORK

(75) Inventors: Thomas Belling, Erding (DE); Franz Kalleitner, St. Georgen im Attergau (AT); Norbert Seitter, Kempten (DE)

(73) Assignee: Siemens Aktiengesellschaft, München (DE)

( * ) Notice: Subject to any disclaimer, the term of this patent is extended or adjusted under 35 U.S.C. 154(b) by 1935 days.

(21) Appl. No.: 12/083,878

(22) PCT Filed: Sep. 8, 2006

(86) PCT No.: PCT/EP2006/066185
§ 371 (c)(1),
(2), (4) Date: Apr. 21, 2008

(87) PCT Pub. No.: WO2007/045527
PCT Pub. Date: Apr. 26, 2007

(65) Prior Publication Data
US 2009/0290573 A1    Nov. 26, 2009

(30) Foreign Application Priority Data

Oct. 21, 2005    (DE) .................. 10 2005 050 586

(51) Int. Cl.
*H04L 29/06* (2006.01)
*H04N 7/14* (2006.01)
*H04N 7/15* (2006.01)

(52) U.S. Cl.
CPC ...... *H04L 65/1043* (2013.01); *H04L 65/1069* (2013.01); *H04N 7/148* (2013.01);
(Continued)

(58) Field of Classification Search
CPC ... H04L 65/1069; H04L 65/60; H04L 65/601; H04L 65/605; H04L 29/06027;
(Continued)

(56) References Cited

U.S. PATENT DOCUMENTS

2002/0078151 A1* 6/2002 Wickam et al. .............. 709/204
2003/0214573 A1   11/2003 Oh
(Continued)

FOREIGN PATENT DOCUMENTS

EP    1 509 018        2/2005
EP    1 509 018 A1    2/2005
(Continued)

OTHER PUBLICATIONS

Office Action issued by the Japanese Patent Office dated May 8, 2012 in the related Japanese patent application 2008-535996.

*Primary Examiner* — Asad Nawaz
*Assistant Examiner* — Najeebuddin Ansari
(74) *Attorney, Agent, or Firm* — Henry M. Feiereisen LLC

(57) ABSTRACT

A method establishes a video telephone connection in a data network that includes a telephone network and an IP network based on the internet protocol. The expression video telephony connection is to be taken generally in this context and encompasses multimedia telephony in addition to pure video telephony.

21 Claims, 16 Drawing Sheets

(52) U.S. Cl.
CPC ......... *H04N 7/152* (2013.01); *H04L 65/1006* (2013.01); *H04L 65/1016* (2013.01)

(58) Field of Classification Search
CPC ............. H04L 65/1006; H04L 65/1043; H04L 65/104; H04L 65/1083; H04L 29/06319; H04L 45/04; H04L 69/24
USPC .................................. 370/352–356, 465–468
See application file for complete search history.

(56) References Cited

U.S. PATENT DOCUMENTS

| | | | | |
|---|---|---|---|---|
| 2003/0236892 | A1* | 12/2003 | Coulombe | H04L 67/2823 709/228 |
| 2004/0028037 | A1* | 2/2004 | Rasanen et al. | 370/354 |
| 2004/0076145 | A1* | 4/2004 | Kauhanen | H04L 29/06027 370/352 |
| 2004/0083291 | A1* | 4/2004 | Pessi et al. | 709/227 |
| 2004/0095923 | A1* | 5/2004 | Ejzak et al. | 370/352 |
| 2004/0095958 | A1* | 5/2004 | Ejzak et al. | 370/465 |
| 2004/0196867 | A1* | 10/2004 | Ejzak et al. | 370/468 |
| 2005/0025130 | A1 | 2/2005 | Hoffmann | |
| 2005/0058125 | A1* | 3/2005 | Mutikainen et al. | 370/354 |
| 2006/0002373 | A1* | 1/2006 | Denny | 370/352 |
| 2006/0193345 | A1* | 8/2006 | Matsuda et al. | 370/467 |

FOREIGN PATENT DOCUMENTS

| | | |
|---|---|---|
| EP | 1 515 555 A2 | 3/2005 |
| JP | 2000-307720 | 11/2000 |
| JP | 2001-078281 | 3/2001 |
| JP | 2003-500907 | 1/2003 |
| JP | 2003-218952 | 7/2003 |
| JP | 2004-506393 | 2/2004 |
| JP | 2004-506393 T | 2/2004 |
| JP | 2005-159581 | 6/2005 |
| JP | 2006-086557 | 3/2006 |
| WO | 01/05109 A1 | 1/2001 |
| WO | WO 01/05109 A1 | 1/2001 |
| WO | 2004/054221 A1 | 6/2004 |
| WO | WO 2004/054221 A1 | 6/2004 |

* cited by examiner

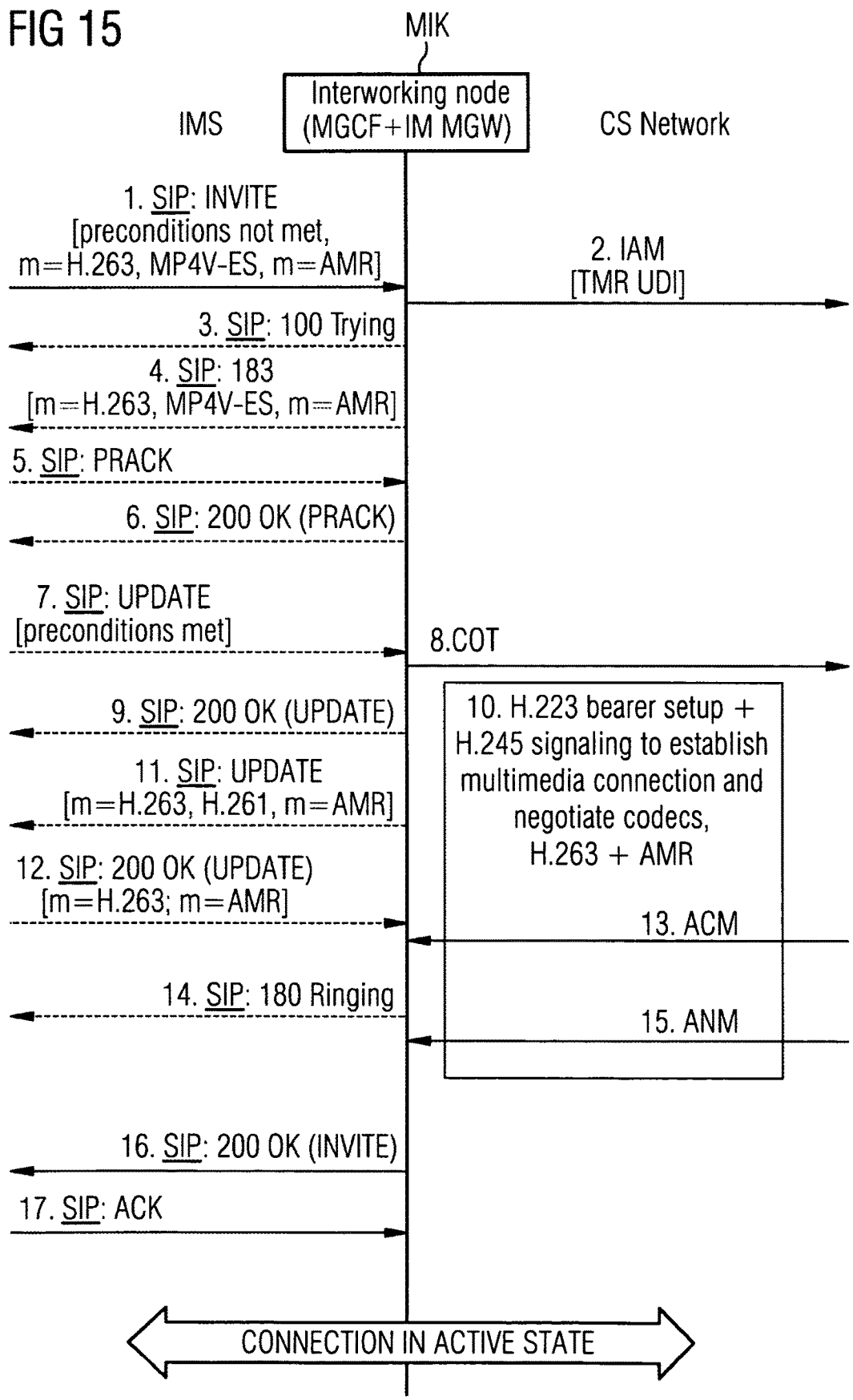

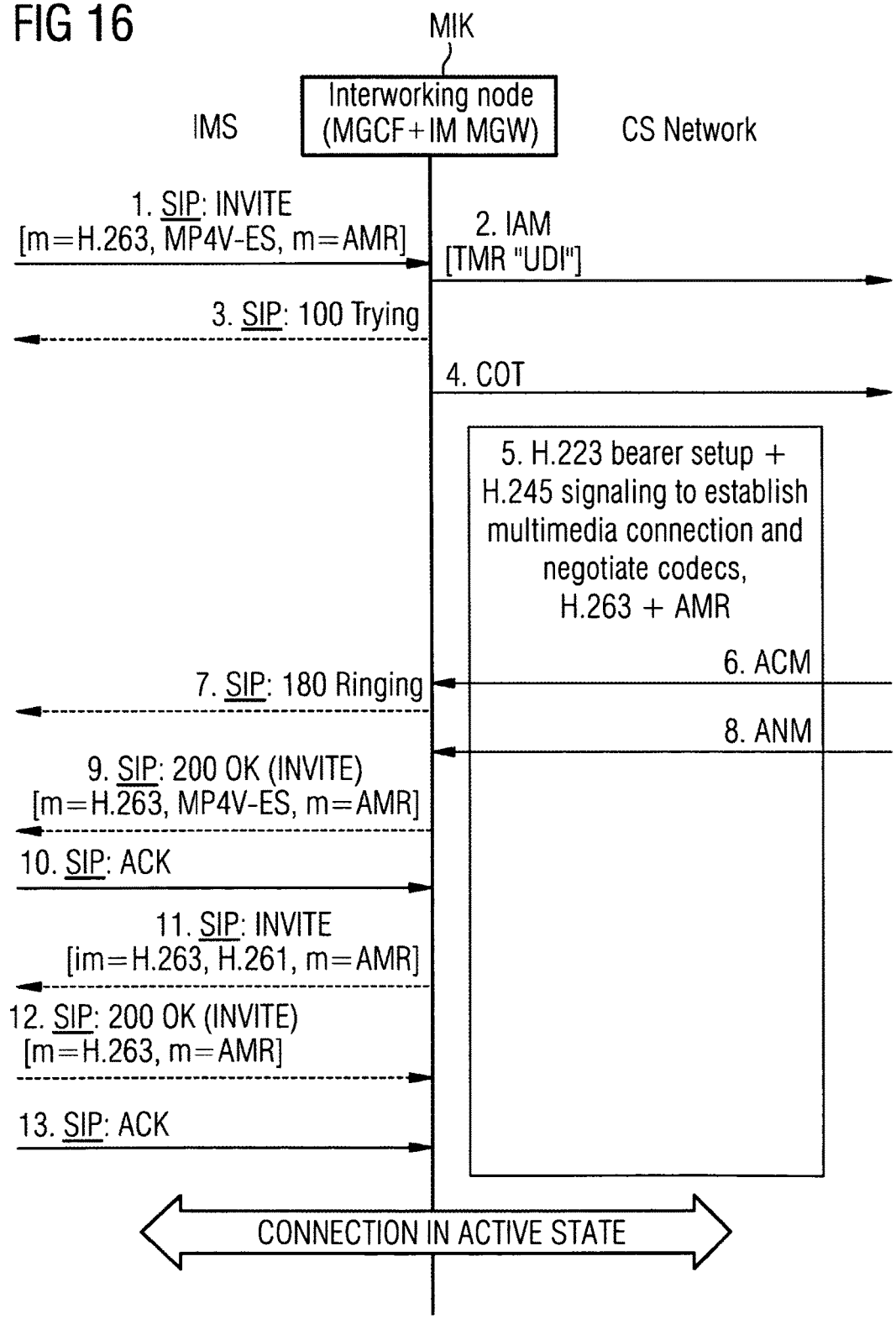

METHOD FOR ESTABLISHING A VIDEO TELEPHONE CONNECTION AND/OR A MULTIMEDIA TELEPHONE CONNECTION IN A DATA NETWORK

CROSS REFERENCE TO RELATED APPLICATIONS

This application is based on and hereby claims priority to German Application No. 10 2005 050 586.4 filed on Oct. 21, 2005 and PCT Application No. PCT/EP2006/066185 filed on Sep. 8, 2006, the contents of which are hereby incorporated by reference.

BACKGROUND OF THE INVENTION

The invention relates to a method for establishing a video telephone connection in a data network comprising a telephone network and an IP network based on the Internet Protocol. The expression video telephone connection is to be understood generally here and in the text below, and encompasses multimedia telephony in addition to pure video telephony.

To transmit multimedia data, it is known from the related art to connect a telephone network, for example a mobile radio network, in particular a GSM or UMTS mobile radio network, to an IP-based network, in order to perform voice and video telephony effectively over such a combined data network. It is necessary to ensure in this case that the services of the telephone network interwork with the services of the IP network, and in particular that conversion of the signaling used and of the transport format of the payload data is ensured.

In the field of 3GPP networks (3GPP=3rd Generation Partnership Project), the 3GPP Standard TS 29.163 specified an interworking between a so-called CS telephone network (CS=Circuit Switched), in particular a 3GPP CS domain or a PSTN network (PSTN=Public Switched Telephone Network), and an IP-based IMS network (IMS=IP Multimedia Subsystem). However, the specification relates purely to voice telephony, and no method of effectively establishing a video telephone connection between a CS network and an IMS network (IMS=IP Multimedia Subsystem) is known.

SUMMARY

One potential object is therefore to provide a method which enables the establishment of a video telephone connection between a subscriber at the telephone network end and a subscriber at the IP network end.

In a method proposed by the inventors, in a step a) a call is established between a first subscriber located in or adjacent to the telephone network and a second subscriber located in or adjacent to the IP network over the telephone network and the IP network with the aid of a first signaling protocol in the telephone network and a second signaling protocol in the IP network. A subscriber is understood here to refer in particular to a terminal, especially a mobile radio terminal or a fixed network terminal. To ensure signaling between the first and the second signaling protocol, signaling messages of the first signaling protocol are converted during call establishment into signaling messages of the second signaling protocol and/or vice versa (step b)). In a step c), during said conversion one or more encoding methods are defined which can be used and/or can foreseeably be used in the telephone network for the transmission of the payload data exchanged during the video telephone connection. The encoding methods are defined in this way because usually no information about the encoding methods that can be used for the payload data is transmitted during signaling with the first signaling protocol in the telephone network. This information is only transmitted in the telephone connection at a later point in time, namely during establishment of the actual data connection for transmitting the payload data. On the other hand, a signaling protocol used in the IP network requires the information relating to the encoding methods that can be used. Therefore, in a step d), the encoding methods defined in step c) are sent into the IP network using one or more signaling messages of the second signaling protocol. A data connection for transmitting the payload data exchanged during the video telephone connection is then established following and/or during the call establishment. Within the data connection, in particular during its establishment in accordance with step e), the encoding method used for the payload data is then determined at the telephone network end with the aid of a third signaling protocol, in particular H.245.

The proposed method is based on the finding that it is necessary to define encoding methods that can already be used or can foreseeably be used for signaling in the IP network. However, since the encoding methods are not yet known at the telephone network end during signaling, in the method it is estimated or determined in advance which encoding methods can be used or can foreseeably be used for the transmission of the payload in the telephone network. This information is then used by the second signaling protocol. As a consequence, the method can ensure a faster connection establishment, since it is not necessary to wait for the actual establishment of the data connection in which the encoding methods actually used in the telephone network are notified.

The method is preferably used in the aforementioned 3GPP data network. In particular a CS network and/or a PSTN network, which were already mentioned above, is used as the telephone network. In the method, the BICC Protocol (BICC=Bearer Independent Call Control) known from the related art is preferably used as the first signaling protocol. Alternatively or in addition, it is also possible to use the ISUP Protocol (ISUP=ISDN User Part) which is known from the related art. The aforementioned IMS network is preferably used as the second IP network. Furthermore, the SIP/SDP Protocol (SIP=Session Initiation Protocol; SDP=Session Description Protocol) which is well known from the related art is also possible as the second signaling protocol. In a preferred embodiment, the known preconditions extension is used in the SIP Protocol in order to signal following step f) that the establishment of a transport connection (also referred to as bearer connection) has been completed.

In a preferred embodiment, steps b) to d) of the method are performed in one or more interface nodes between the telephone network and the IP network; the interface nodes preferably comprise an MGCF node (MGCF=Media Gateway Control Function) and an IM-MGW node (IM-MGW=IMS Media Gateway). This type of interface node or interface processors respectively are well known from the related art and are therefore not described in greater detail here.

In a particularly preferred embodiment, the H.324 protocol family which is well known from the related art is used during the establishment of the data connection in step e). If a mobile radio network is used as the telephone network, a variant of said protocol, namely the H.324M Protocol, is used here.

To ensure an effective estimation of the encoding methods that can be used in the telephone network during step c), in a preferred embodiment the encoding methods are defined during this step depending on the telephone network used. This is based on the finding that particular encoding methods are preferred depending on the telephone network used.

In another embodiment, the encoding methods are defined in step c) of the method depending on the call number of the first subscriber located in or adjacent to the telephone network end. This is based on the finding that the call number of the first subscriber can be used to identify the telephone network in which the subscriber is located. In turn it is then possible to deduce which encoding methods are preferably used.

In a further embodiment the encoding methods that are most probably used in both networks are defined in step c) depending on the telephone network used and the IP network used. This ensures that the correct selection of compatible encoding methods is already defined in advance. Such a selection of encoding methods may be obtained and optimized for example by statistical analysis or by administrative settings. In particular it is also possible for only one voice and video encoding method to be selected.

In another embodiment, the signaling messages of the first signaling protocol can be designed in such a way that they contain information about the voice encoding methods that can be used in the telephone network. Said voice encoding methods are likewise preferably taken into account during definition of the encoding methods in step c). As a result, a smooth establishment is ensured even in the case where only pure voice telephony is selected at the IP network end.

In a particularly preferred embodiment, during the establishment of the data connection in step f) of the method, one or more first specification messages are transmitted in the telephone network, a first specification message specifying the encoding methods that can be used in the first subscriber. Said first specification messages are known in particular in the related art as "Terminal Capability Set" messages TCS from the H.245 Protocol for negotiating the encoding methods. The encoding methods specified in a first specification message are compared in particular with the encoding methods defined in step c). If the result of the comparison shows that there is either no match or only a partial match between the encoding methods specified in the first specification message and the encoding methods defined in step c), in a preferred embodiment a signaling message of the second signaling protocol is sent into the IP network, which signaling message contains at least some of the encoding methods specified in the first specification messages. This ensures that it is possible to establish a data connection even if the originally estimated encoding methods do not match the encoding methods that can actually be used.

In another preferred embodiment of the method, signaling messages of the second signaling protocol are transmitted in the IP network; said signaling messages specify the encoding methods that can be used in the second subscriber and additionally send the encoding methods contained in said signaling messages into the telephone network with a second specification message during establishment of the data connection in step e). In this way, the information received at the IP network end about the encoding methods is taken into account during the negotiation of the encoding methods in the telephone network, which is performed in particular using the H.245 Protocol.

In another embodiment, a signaling message of the second signaling protocol which specifies the encoding methods that can be used in the second subscriber is compared with a first specification message and the establishment of the video telephone connection is terminated or a switchover to voice telephony is initiated, preferably with the aid of the SCUDIF "Service Change" procedure according to the 3GPP Standard 3GPP TS 23.172, if there is not at least one match of encoding methods required for a video telephone connection in the signaling message and the first specification message.

In particular the encoding methods used in the proposed method relate to voice and video encoding methods that are used in video telephony. The method may however also comprise further data encoding methods as appropriate.

In another embodiment of the method, in particular in the case where an SIP Protocol used does not support the preconditions extension, the second subscriber is instructed not to transmit any payload data until a predetermined process step of the data connection establishment, in particular the establishment of the transport connection in the telephone network, has been completed. This avoids so-called "clipping", that is to say the loss of voice and video sent by the called party before a through transport connection is present.

In addition to the above-described method, the inventors also propose a data network with a telephone network and an IP network based on the Internet Protocol in which the data network is designed in such a way that the method can be performed. For this purpose the data network preferably has one or more interface nodes between the telephone network and the IP network, the interface nodes serving to perform steps b) to d) of the method. The interface nodes preferably comprise the MGCF and IM-MGW nodes well known from the related art which were already mentioned in the description of the method.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 2-FIG. 16 show signaling diagrams illustrating the signaling sequence of the messages in the protocols used with the proposed method and data network for various scenarios.

DETAILED DESCRIPTION OF THE PREFERRED EMBODIMENT

Figure 1:
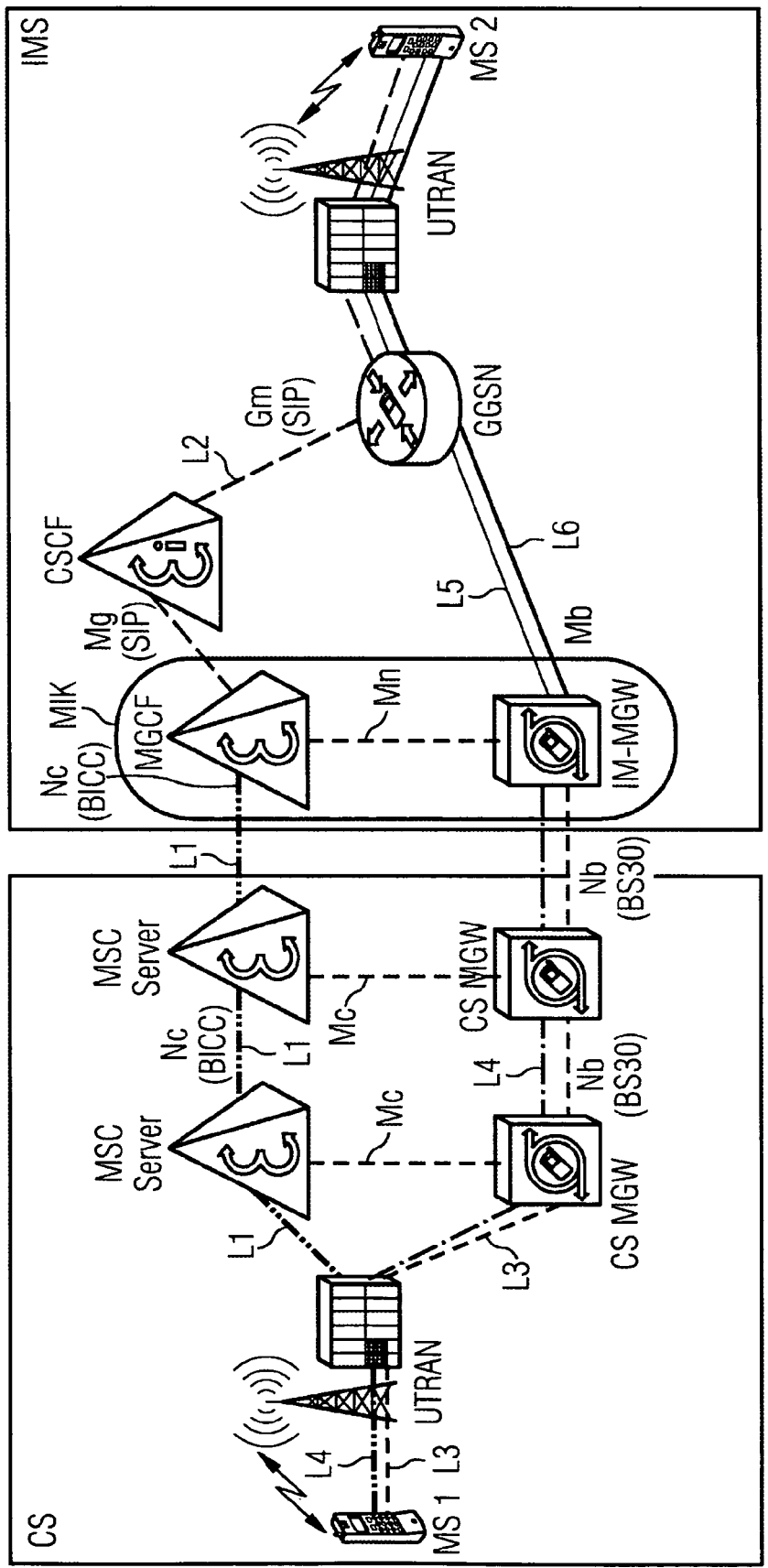
FIG. 1 shows a schematic representation of an embodiment of a data network in which the method proposed by the inventors can be used.

Reference will now be made in detail to the preferred embodiments of the present invention, examples of which are illustrated in the accompanying drawings, wherein like reference numerals refer to like elements throughout.

Before detailed embodiments of the method proposed by the inventors are described, first of all the already existing developments in the related art will be discussed for better understanding. In particular, the developments in data networks for which the method proposed by the inventors is preferably used will be discussed here. The protocols and their acronyms defined in the text below and also above are well known from the related art and are therefore not explained in more detail.

The so-called "Circuit Switched Domain" network CS and the so-called "IP Multimedia Subsystem (IMS)" network for voice and video telephony are known from the 3GPP mobile radio project. A so-called "interworking" of the respective services of these networks must be ensured in this case, that is to say a connecting of the services between IMS and the CS domain is necessary by appropriate conversion of the signaling used and of the transport format of the data used. In addition to the 3GPP access networks "Global System for Mobile Communications" (GSM) and "Universal Mobile Telecommunications System" (UMTS), the IMS is also used for other access networks, for example "Wireless Local Area Network" (WLAN) and "Digital Subscriber Line" (DSL). Particularly in these scenarios, it can initially be expected that voice and video telephony are conducted over the IMS. Video telephony can also be used in a public telephone network, i.e. a so-called "Public Switched Telephone Network" (PSTN); as a rule the same protocols as in the 3GPP CS domain are used here for transport and signaling. Interworking with the IMS is also necessary from a PSTN network.

Interworking between an IMS and a CS domain or PSTN has hitherto only been described for voice telephony. The proposed method relates to the corresponding interworking for video telephony. A need for this can be anticipated, as video telephony is gaining in significance in both the 3GPP CS domain and in the IMS, in particular for access networks such as WLAN or DSL or for newly created network access technologies (e.g. Worldwide Interoperability for Microwave Access (WiMAX)).

From 3GPP Release 6, interworking between an IMS network and a CS network, that is to say a PSTN or a 3GPP CS domain, is only specified for pure voice telephony in 3GPP TS 29.163.

According to TS 29.163, the interworking of the so-called "call control" signaling is performed in the so-called "Media Gateway Control Function" (MGCF). The interworking of the payload connection, that is to say the forwarding and repacketing as well as any necessary transcoding of the payload data, is performed in the so-called "Internet Multimedia-Media Gateway" (IM-MGW). The MGCF controls the IM-MGW by the H.248 Protocol standardized by ITU-T, as is described further in 3GPP TS 29.332. In the text below, MGCF and IM-MGW are referred to together as "multimedia interworking node" (MIK).

Bearer Independent Call Control (BICC) or ISDN User Part (ISUP) is used for call control signaling in the CS network. Where the call control signaling is conducted separately from the transport connections, this method is also known as "out-of-band" signaling. It is furthermore also possible to exchange signaling messages within the transport connection, which is known as "in-band" signaling. In the case of ISUP, time-division multiplexing (TDM) is used as the transport mechanism in the CS network, and in the case of BICC, packets are transported using the Internet Protocol (IP) or Asynchronous Transfer Mode (ATM). The negotiation as to whether pure voice telephony or video telephony is used can be performed for ISUP during call control signaling to establish the call using the so-called ISUP "UDI Fallback" procedure. For BICC, this negotiation can be performed using the "Service Change and UDI Fallback" (SCUDIF) standardized in 3GPP TS 23.172, which also enables switching between voice telephony and video telephony during the call. Both UDI Fallback and SCUDIF use out-of-band signaling. In addition, it is possible for ISUP and BICC not to use the aforesaid procedures and to attempt to establish a call (also referred to as call control) only for video telephony, and to terminate the call establishment if video telephony is not supported. In contrast to the optional negotiation between voice and video, the negotiation of the voice and video codecs used for video telephony is performed in-band once video telephony has already been previously selected and a corresponding transport connection (also known as bearer) has been established.

In the CS network a so-called BS30 data connection having a bandwidth of 64 kbyte/s is used for video telephony. Within said data connection, the H.324 protocol suite standardized by ITU-T is used, with the H.324M variant adapted for mobile radio communications being selected in the 3GPP CS domain. Once the call has been established, the configuration of the multimedia connection is negotiated here in-band using the H.245 Protocol standardized by ITU-T, especially the video codec and voice codec used and the details of the respective codec configuration. Voice and video are multiplexed in the same transport connection using the H.223 Protocol. For the 3GPP CS domain, TS 26.110 further describes the use of the H.245 protocol suite, with the so-called H.324M configuration being selected in particular.

The most important sequences when establishing a 3G-324M connection (or "session") are as follows:

1. Following the start of the ISUP or BICC call establishment signaling, the necessary resources that are required for the desired bearer are reserved and the transport connection is then established.
2. Start of in-band negotiation. Firstly negotiation of which H.223 "multiplexer level" is to be used for this transport connection.
3. Determination of the leading terminal that opens the multistream connection by H.245 negotiation, if necessary. This function is only required if there is a conflict in relation to the opening of a bidirectional logical channel. This function is referred to as "master or slave determination" (MSD).
4. Using so-called "Terminal Capability Set" H.245 messages TCS, the capabilities of the terminal sending the message are transmitted. Such messages are sent independently of the two terminals. The aforesaid capabilities include the following information: audio and video codecs and their specific characteristics or versions; functionality of the multiplexer, in detail what adaption layer is supported (e.g "simple" or "nested" multiplexing) and its mobile radiocommunications-specific extensions.
5. Establishment of "logical" channels for each media stream by H.245 signaling. From this time onward, either with MSD or without, the terminal or the IM-MGW respectively is ready to open logical channels to enable the exchange of voice and/or video payload data. During the setup of a bidirectional logical channel, the channel number and the media capabilities to be ultimately used are defined.
6. Definition of the multiplexing characteristics by H.245.
7. Start of transmission of video, audio/voice or data.

In IMS the negotiation for video telephony is performed out-of-band using the so-called "Session Description Protocol" (SDP), IETF RFC 2327, which is transported using the so-called "Session Initiation Protocol" (SIP), IETF RFC 3261. The negotiation as to whether voice telephony or video telephony is used is associated here with the negotiation of the codec used, and is performed before or during bearer setup. The so-called SDP "offer-answer" mechanism according to RFC 3264 is used. With this mechanism, the offering party sends in the SDP offer message a list of codecs supported. After it receives this message, the answering party sends an SDP "answer" message containing the codecs from the list that it also supports and wishes to use. The answering party must not specify any codecs that were not contained in the list of the SDP offer. In contrast to the CS domain, two separate transport connections (or "bearers") are used for voice and video which use the so-called "Real Time Transport Protocol" (RTP), IETF RFC 3550, in each case. For the 3GPP IMS which uses a General Packet Radio Service (GPRS) as an access network, 3GPP TS 26.235 describes the codecs to be used for video telephony.

The protocols and codecs used for video telephony at the CS domain end and at the IMS end are summarized again below:
CS network (in particular 3GPP CS domain):
Call control:
  BICC or ISUP.
  Negotiation between pure voice telephony and video telephony can be performed for ISUP using UDI Fallback and for BICC using SCUDIF.
H.324M multimedia protocol suite (H.324 Annex C):
Codec negotiation:
  H.245 in-band negotiation over the set up CS bearer with 64 kbit/s
Video codec:
  Support for H.263 mandatory
  H.261 optional
  MP4V-ES (simple video profile level 0) optional
Voice codec:
  Support for NB-AMR mandatory
  WB-AMR optional
  G.723.1 recommended
Transport:
  Multiplexing of voice and video in one bearer according to H.223 Annex A+B
IMS (codecs for GPRS access network):
Call control:
  SIP
  Includes both negotiation between pure voice telephony and video telephony, as well as codec negotiation.
Codec negotiation:
  Before bearer setup out-of-band using SDP which is transported in SIP.
Video codec:
  Support for H.263 mandatory,
  H.264 optional.
  MP4V-ES (simple video profile level 0) optional.
Voice codec:
  Support for NB-AMR and WB-AMR mandatory.
Transport:
  Two separate RTP bearers for voice and video using different so-called RTP payload formats:
  Voice:
    Nb-AMR+WB-AMR: IETF RFC 3267
  Video:
    H.263: IETF RFC 2429
    H.264 (AVC): IETF RFC 3984
    MPEG-4: IETF RFC 3016
  Synchronization of parallel RTP media streams is performed using so-called RTP timestamps negotiated by the "Real Time Control Protocol" (RTCP, see IETF RFC 3550).

In addition to or instead of the codecs specified here, it is however also possible for other codecs to be supported by the terminals, in particular if the CS terminals are located in the PSTN, or if the IMS terminals do not use GPRS as the access network.

To avoid transcoding, it is desirable to use the same video codec, and if possible also the same voice codec, at the CS end and in the IMS. Transcoding, in particular of the video codec, but also of the voice codec to a lesser extent, would require considerable processing power and resources in the IM-MGW. In addition, the transmission would be delayed and the quality of the image or of the voice would be impaired. If the required bandwidth for the codecs is different at the CS domain and IMS ends, additional bandwidth would be used at one end without thereby improving the image or voice quality.

FIG. 1 shows a typical network configuration as can be used in the embodiment described below.

The figure shows the network configuration required so that a terminal in the form of a mobile terminal MS1 connected to the 3GPP CS domain can communicate with a terminal in the form of a mobile terminal MS2 connected to the IMS. The CS domain is connected to the IMS with the aid of a Media Gateway Control Function (MGCF) and an IMS Media Gateway (IM-MGW). The MGCF controls the IMS Media Gateway via the so-called "Mn" interface. Located in the core network at the CS domain end are so-called "Mobile Switching Center" (MSC) servers that communicate with one another and with the MGCF using BICC signaling. They control CS-MGWs in each case. The CS-MGWs are connected to one another and to the IM-MGW via the so-called "Nb" interface. The so-called "BS30" data transport service (or "bearer service") is used for video telephony. MS1 is connected by a so-called radio access network, for example a UTRAN, to an MSC server of a CS-MGW. At the IMS end, the MGCF communicates with the aid of the SIP call control protocol with so-called "call session control functions" (CSCF) that forward the signaling via the "gateway GPRS support node" (GGSN) and a radio access network, for example a so-called UTRAN, to the mobile terminal MS2. Data is transported from the IMS Media Gateway via the Mb interface to the GGSN, which likewise forwards said data over the radio access network UTRAN to the MS2.

In FIG. 1 therefore, the line L1, which runs via the two MSC servers to the MGCF, denotes the BICC signaling. The line L2, which runs from the MGCF via the CSCF to the GGSN and from there to the UTRAN at the IMS end, denotes the SIP signaling. Furthermore, the line L3, which runs from the interface UTRAN at the CS end via the two CS-MGWs and IM-MGW, denotes the combined voice/video stream. The line L4, which—analogously to the line L3—runs from the UTRAN at the CS end via the two CS-MGWs to the IM-MGW, denotes transmission according to the H.245 Protocol. The line L5, which runs from the IM-MGW via the GGSN to the UTRAN at the IMS end, relates to transportation of the video stream in the IMS network, and the line L6, which likewise runs from the IM-MGW via the GGSN to the UTRAN at the IMS end, relates to the voice stream transported in the IMS network.

A method that uses the interworking of video telephony while avoiding transcoding between a CS network, i.e. a PSTN or a 3GPP CS domain, as well as an IP network that uses SIP and SDP to negotiate the codecs, i.e. the IMS for example, forms the subject matter described herein.

In the case where a call is established at the CS network end in the direction of the IMS, hereafter referred to as "IMS-terminating" (IMS-T) call establishment, the MGCF first receives ISUP or BICC signaling, from which it can detect or infer that video telephony is desired, but not which voice and video codecs are used.

In the case where a call is established at the IMS end in the direction of the CS network, hereafter referred to as "IMS-originating" (IMS-O) call establishment, the MGCF first receives SIP signaling, from which it can detect or infer that video telephony is desired as well as which codecs are supported by the IMS.

To achieve a fast connection establishment, and thereafter implement appropriate signaling between the IMS and the CS network, in the case of IMS-O call establishment—as also in the case of IMS-T call establishment—for the signaling in the direction of the IMS it is necessary for the MGCF to provide details about the codecs supported at the CS end before it receives this information from the H.324/M connection. Often said information is only made available at the CS end once the out-of-band call control signaling for call establishment has already been completed, for example when the transport connection is switched through at this time. In many networks, data sent in the transport connection in the direction of the call establishment, so-called "forward early media", is blocked until this time.

The essence is that, in the SIP codec negotiation during call establishment, the multimedia interworking node (MIK) initially only outputs an estimate of the codecs supported at the CS end. In an advantageous embodiment, when selecting the codecs the MIK takes account of the CS network to which it is connected. If the CS network is a 3GPP CS domain, the MGCF preferably uses the codecs specified in 3GPP TS 26.110. Other codecs may predominate in a fixed network. In another advantageous embodiment, when selecting the codecs the MIK takes account of the network in which the call subscriber at the CS end is located. Thus in the case of IMS-O, the MIK uses the telephone number of the called party to determine the network in which the called party is located in order to select probable codecs for this network. In the case of IMS-T, the MIK uses the telephone number of the caller to determine the network in which the caller is located in order to select probable codecs for this network. The selection of codecs may be optimized by the operator of the MIK by statistical analysis or by administrative settings.

In a simpler embodiment, the MIK selects in each case only one voice codec and video codec that will very probably also be supported by the terminal in the IMS, for example the H.263 and the AMR codec. This embodiment may be sufficient because according to 3GPP TS 26.235 and TS 26.110, the same voice and video codecs must be supported in the CS domain and the IMS. The embodiment is expedient for simplifying the following signaling sequences.

If SCUDIF is used in the case of IMS-T, it is advantageous if, in addition to the selected codecs described above, the MIK also includes the voice codecs that are included in a codec list if SCUDIF was used in the IAM message (IAM=Initial Address Message) initially transmitted during call establishment. As a result, a smooth call establishment is ensured even in the case where voice telephony is selected at the IMS end.

The MIK then receives a so-called Terminal Capability Set message during the H.245 in-band negotiation. Said message contains details about the capabilities of the terminal at the CS network end, inter alia about the video codecs and voice codecs supported, with exact information about which options of the individual codecs are supported, the MIK compares the codecs contained therein with the previously estimated codecs that were signaled into the IMS. If the codecs differ, it may be expedient or necessary for the MIK to again send an SDP offer into the IMS at this time, forwarding the codecs specified in the Terminal Capability Set message. The SDP offer can be transported for example by an SIP re-INVITE or UPDATE message. A renewed SDP offer is required in particular if the previously estimated codecs do not match the codecs received in the Terminal Capability Set message at least with one voice codec and video codec in each case.

In the case of IMS-O, the MIK has already received information about the codecs supported at the IMS end in the SIP INVITE message. If these codecs do not match the codecs received in the Terminal Capability Set message in at least one voice codec and video codec in each case, it is expedient if the MIK clears down the H.223 connection and continues the call establishment as voice telephony, for example by using SCUDIF or by first terminating the call establishment completely at the CS end and then beginning anew for voice telephony. The case may also occur where, in the SDP answer it previously sent, the MIK has excluded a codec supported at the IMS end which it does after all now want to select as a result of the codecs received in the Terminal Capability Set message.

In the case of IMS-T, in contrast the MIK sends the estimated codecs in an SDP offer and from the received SDP answer only has the information about which of its initially estimated codecs are supported at the IMS end. It is therefore useful to inquire by a new SDP offer whether codecs not contained in the first SDP offer are supported in the IMS.

A further key point is that the MIK forwards the details about codecs received from the IMS end during the H.245 in-band negotiation by a Terminal Capability Set message. The MIK preferably waits with sending this message until it has received the SDP message with details about the codecs from the IMS end. It is particularly advantageous if the MIK also waits for the reception of a Terminal Capability Set message for a given time before sending said message itself since, as described above, the MIK can decide on the basis of the codec information contained in the received Terminal Capability Set message to send an SDP offer at the IMS end, and take account of the information contained in the following SDP answer in the Terminal Capability Set message it sends.

If, however, the MIK does not receive any Terminal Capability Set message from the other end for a given time, for example because behind the CS network there is in turn another MIK at a gateway to an IMS network, it may be necessary for the MIK to itself send a Terminal Capability Set message before receiving a Terminal Capability Set message, in said message the MIK specifies the codecs that were contained in the last SDP message sent or received at the IMS end. If, following sending of a Terminal Capability Set message at the IMS end, the MIK again receives an SDP message that excludes codecs permitted in the first Terminal Capability Set message, then the MIK sends a new Terminal Capability Set message in which the respective codecs are removed.

Once H.245 Terminal Capability Set messages have been exchanged at the CS network end, separate logical channels of the H.223 Protocol for transporting voice and video are selected by H.245 signaling. As a result, exactly one of the supported voice codecs and video codecs is selected in each case. If a plurality of voice codecs or video codecs are still selected at this time at the IMS end, the MIK resends an SDP offer at the IMS end, in that it exactly specifies the codecs selected by H.245 to prevent a codec that the MIK cannot forward being used by the IMS terminal. The SDP offer can be transported for example by an SIP re-INVITE or UPDATE message.

In the case of IMS-T, it is desirable to avoid "clipping", that is to say a loss of voice or video sent by the called party before a through transport connection is present. If the IMS end supports the SIP preconditions extension according to IETF RFC 3312, the MIK uses the SIP preconditions extension to indicate that so-called "QoS preconditions" are present locally, that is to say establishment of the transport connection is necessary before the call establishment can be completed. As soon as the establishment of the transport connection has been completed at the CS end by the opening of the logical H.223 channels for voice and video, the MIK uses the SIP preconditions extension to indicate that so-called QoS preconditions are met locally. However, it is possible that at the CS end "forward early media" are only passed through following completion of the call establishment in the call control signaling, and that the H.223 and H.245 negotiation within the transport connection becomes possible only at this time. To prevent blocking of the call establishment, the MIK then also signals at the IMS end that so-called QoS preconditions are met locally if no H.223 signaling is received for a given time following establishment of the transport connection.

If the IMS end does not support the SIP precondition extension, or else forward early media are not supported at the CS network end, it is expedient if the MIK instructs the terminal at the IMS end not to send any media streams until the H.223 and H.245 negotiation within the transport connection at the CS end has been completed. The IMS terminal can indicate this information to its user likewise in order to avoid clipping. The MIK uses for this purpose the so-called "hold" procedure described in RFC 3264, for example the SDP "inactive" attribute. As soon as the establishment of the transport connection has been completed at the CS end by the opening of the logical H.223 channels for voice and video, the MIK then uses the "resume" procedure according to RFC 3284 to enable the terminal at the IMS end to send media streams.

In the case of IMS-T, it is possible that video telephony is not clearly detectable in the call control signaling because only one transparent BS30 bearer is signaled (e.g. only parameter "TMR" with the value "UDI" in the "IAM" message). In this case, in addition to a voice and a video codec at the IMS end, the MIK preferably also offers other potential data codecs, for example the so-called "Clearmode" codec, IETF RFC 4040, or a FAX codec, for example in the RFC 3362 format. The Clearmode codec enables a BS30 data service to be forwarded transparently through the IMS. The use of the Clearmode codec is therefore also advantageous for facilitating interworking in the case where the connection establishment is forwarded from the IMS to another MIK. In one embodiment the MIK initially configures the transport connection at the CS end only for the BS30 service, and does not yet switch through the data connection. As soon as the MIK receives signaling from the IMS end relating to the codecs selected, the MIK can detect whether video telephony is involved, and if so starts the H.223 in-band negotiation. In another embodiment, the MIK starts the in-band negotiation using H.223 and H.245 already once it receives the IAM message. If the MIK receives signaling from the IMS end relating to the codecs selected, and detects from this that no video telephony was selected, the MIK terminates the attempted H.223 and H.245 negotiation.

The call establishment for various scenarios in accordance with the method is explained in detail below.

Figure 2:
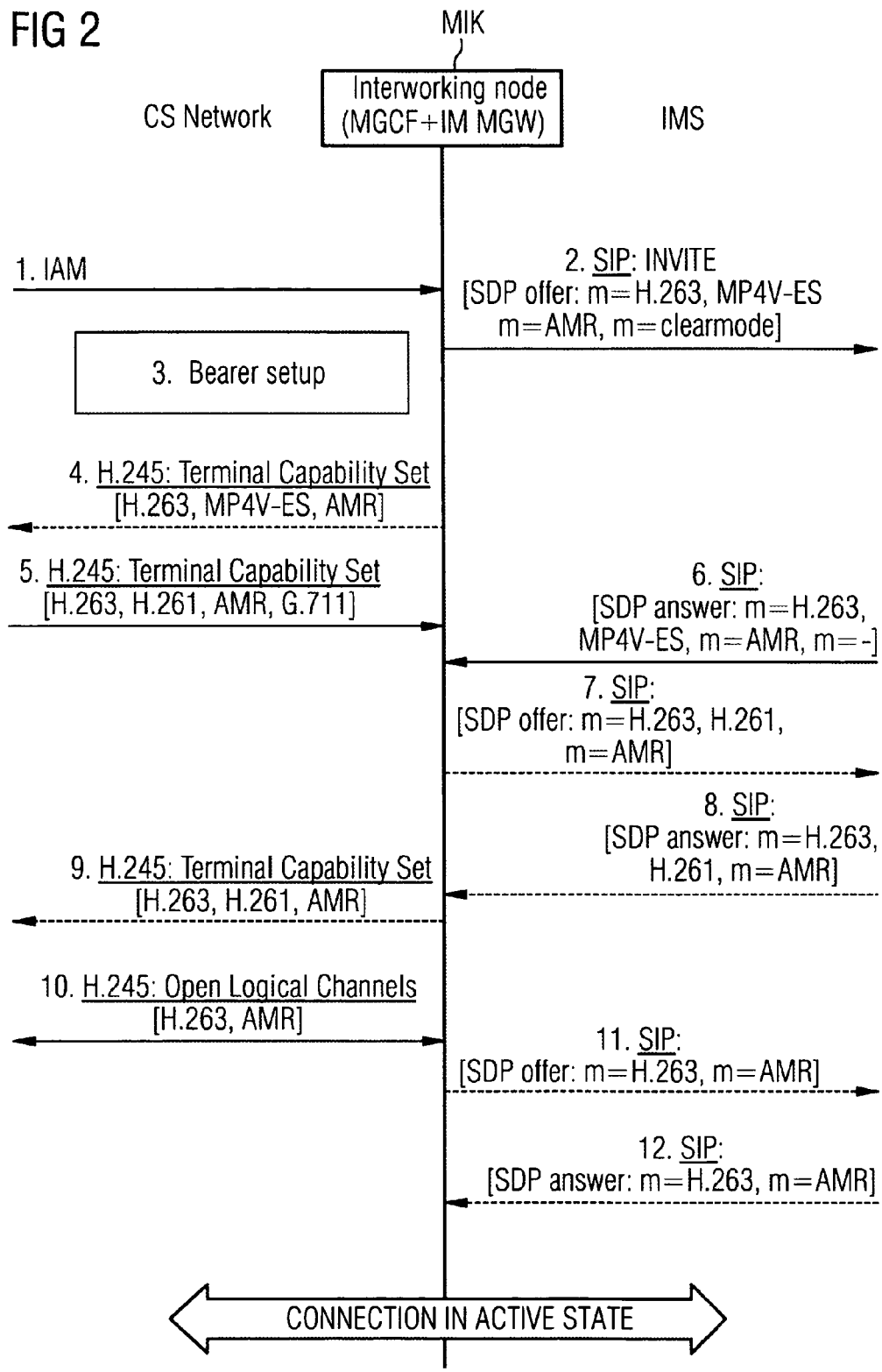

FIG. 2 shows with the aid of the signaling sequence the principle of interworking between the H.245 signaling and at the CS end and the SIP/SDP call control signaling at the IMS end by a multimedia interworking node (MIK), which may comprise MGCF and IM-MGW for example, in the case of a call established from the CS network end in the direction of the IMS, which is referred to hereafter as "IMS-terminating" (IMS-T) call establishment. Only the messages directly relevant to the method are shown.

In detail, the signaling steps are as follows:

1. The MIK receives a so-called BICC or ISUP "IAM" message from the CS end. On the basis of the parameters it contains, the MIK detects that video telephony is desired or could be desired. The IAM message does not contain any details about the voice and video codecs to be used for video telephony.

2. The MIK converts the IAM message into an SIP INVITE message, in the SDP offer contained therein the MIK provides details about the voice codecs (AMR in the example) and video codecs (H.263 and MP4V-ES in the example) that will probably be supported at the CS end for H.324 video telephony. When selecting the codecs, the MIK can also take account of which codecs the operator of the IMS network wishes to use, in order for example not to require too great a bandwidth for the transmission to the air interface. To keep the signaling sequence and the implementation simple, it is expedient if the MIK selects in each case only one voice codec and video codec that will very probably also be supported by the terminal in the IMS, for example the H.263 and the AMR codec. Steps 7, 8, 11 and 12 can consequently be avoided if the selected codecs are actually supported at the CS end and in the IMS. If, however, the MIK does not know with sufficient probability that a particular voice codec and video codec is supported at the CS end and in the IMS in each case, it is expedient to include all potential codecs in order at least to avoid the messages 7 and 8 with a certain degree of probability.

It is advantageous if the MIK additionally also inserts the Clearmode codec, RFC 4040, to facilitate interworking in the case where the connection establishment is forwarded from the IMS to another MIK. The Clearmode codec enables a BS30 data service to be forwarded transparently through the IMS.

3. The transport connection is established at the CS network end. The in-band negotiation of the H.223 multiplexer level is then performed via the transport connection and a logical H.223 channel is opened to exchange H.245 messages.

4. The MIK expects an H.245 Terminal Capability Set message 5 in the transport connection. According to the proposed method, only if it has not received said message within a given time, for example because there is another MIK at the CS end, does the MIK send an H.245 Terminal Capability Set message in which it specifies the voice codecs and video codecs sent in message 2 or, if message 6 has already arrived, the codecs received therein.

5. The MIK contains an H.245 Terminal Capability Set message in the transport connection. Said message contains details about the capabilities of the terminal at the CS network end, inter alia about the supported video codecs (H.263 and H.261 in the example) and voice codecs (G.711 and AMR in the example), with exact information about which options of the individual codecs are supported and which codecs can be supported in parallel.

6. The MIK receives at the IMS end an SIP message containing the SDP answer. The SDP answer contains the codecs from the list offered in message 2 that are supported and desired by the terminal at the IMS end, in the example AMR as the voice codec and H.263 and MP4V-ES as video codecs, but not the Clearmode codec. The MIK compares the codecs received in messages 5 and 6. If the codecs match, or their intersection (H.263 and AMR in the example) contains at least one voice and video codec acceptable to the operator, the MIK continues directly with step 9.

7. If message 5 contained additional codecs in comparison with message 2 (the H.261 video codec and the G.711 voice codec in the example), the MIK can decide that it is desirable to check whether said additional codecs are supported at the IMS end, for example because they offer a higher quality or are preferred by the operator of the MIK, or because the previously determined intersection did not contain any voice and/or video codec. In the example the MIK decides to check whether the H.261 video codec is supported at the IMS end. To perform a check, the MIK sends a suitable SIP message, for example a re-INVITE or an UPDATE message, with an SDP offer which contains the codecs of the intersection and additionally the codecs to be checked.

8. If the MIK sent message 7, it again receives an SDP answer within an SIP message. The SDP answer contains the codecs from the list offered in message 6 that are supported and desired by the terminal at the IMS end, in the example AMR as the voice codec and H.263 and H.261 as video codecs.

9. If message 4 was not sent, or the codecs it contains differ from those received in message 8, or in message 6 if steps 7 and 8 were skipped, the MIK forwards the voice and video codecs received in message 8, or in message 6 if steps 7 and 8 were skipped, as well as the details of the codec configuration by an H.245 Terminal Capability Set message.

If the intersection of the codecs forwarded in message 4 or 9 respectively and the codecs received in message 5 contains only one voice codec and video codec in each case, it is expedient to perform step 11 in parallel with step 10.

10. The so-called H.245 master-slave determination, i.e. the determination of the master or slave terminal, is performed. The master-slave determination messages can also have already been sent together with the Terminal Capability Set messages 5 and 4 or 9 respectively. The master-slave determination is only relevant for resolving a resource conflict and therefore will not be considered further. Using H.245, so-called logical channels of the H.223 Protocol are then opened for transmitting the voice and video. In each case here a voice codec and a video codec are selected from the intersection of the codecs transmitted in messages 5 and 4 or 9 respectively.

11. If message 6 or 8 contained more than one voice or more than one video codec, the MIK sends a suitable SIP message, for example a re-INVITE or an UPDATE message, with an SDP offer in which the MIK specifies the voice and video codec selected in step 10.

12. If the MIK sent message 11, it receives an SIP message which contains the associated SDP answer.

Figure 3:
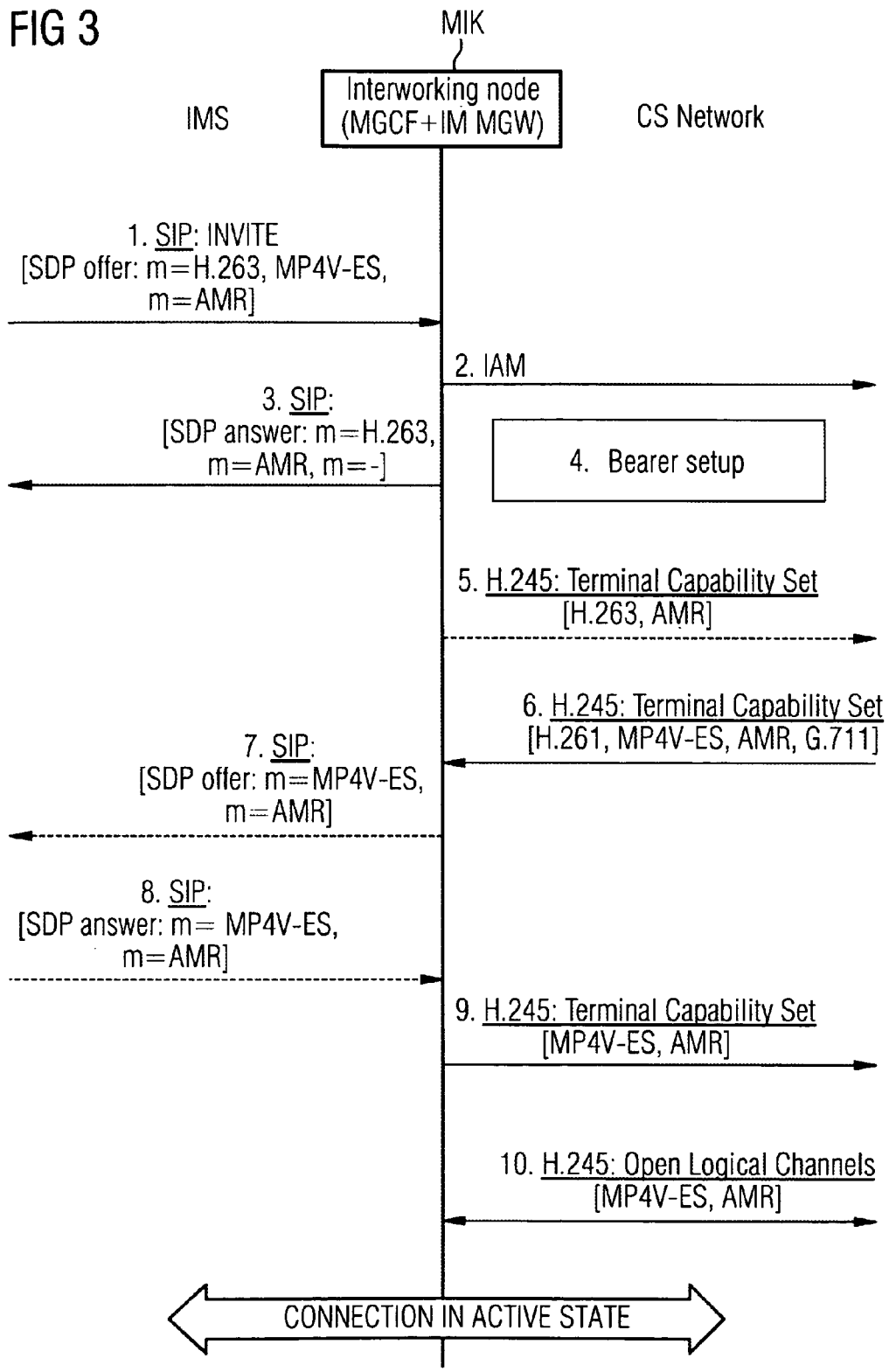

FIG. 3 represents with the aid of the signaling sequence the principle of interworking between the H.245 signaling and at the CS end and the SIP/SDP call control signaling at the IMS end by a multimedia interworking node (MIK), which may comprise MGCF and IM-MGW for example, in the case of a call established from the IMS end in the direction of the CS network, which is referred to hereafter as "IMS-originating" (IMS-O) call establishment. Only the messages directly relevant are shown.

In detail, the signaling steps are as follows:

1. The MIK receives an SIP INVITE message with an SDP offer containing details about the voice codecs (AMR in the example) and video codecs (H.263 and MP4V-ES in the example) that the terminal at the IMS end supports and wishes to use for this call. The MIK detects from the combination of video codecs and voice codecs that video telephony is desired.

2. The MIK sends a so-called BICC or ISUP "IAM" message to the CS end, and specifies therein that video telephony is desired. The IAM message does not however contain any details about the voice and video codecs to be used for video telephony.

3. The MIK sends at the IMS end an SIP message containing the SDP answer. In many cases, owing to specific rules for transporting SDP offers and answers in SIP in RFC 3261, this is already necessary before the establishment of the transport connection at the CS end in step 4 in order not to delay the connection establishment and to enable useful interworking of subsequent SIP and ISUP/BICC messages during the connection establishment. the MIK inserts into the SDP answer the codecs from the list offered in message 1 that are probably supported at the CS end for the H.324/M video telephony (the H.263 video codec and the AMR voice codec in the example). When selecting the codecs, the MIK can also take account of which codecs the operator of the IMS network wishes to use, in order for example not to require too great a bandwidth for the transmission to the air interface.

To keep the signaling sequence and implementation simple, it is expedient if the MIK selects in each case only one voice codec and video codec, for example the H.263 and the AMR codec. Steps 7 and 8 can consequently be avoided if the selected codecs are actually supported at the CS end.

If the MIK has already received message 6 before sending message 3, the MIK selects a voice codec and video codec in each case from the intersection of the codecs in message 1 and 6 and inserts them into message 3.

4. The transport connection is established at the CS network end. The in-band negotiation of the H.223 multiplexer level is then performed via the transport connection and a logical H.223 channel is opened to exchange H.245 messages.

5. The MIK expects an H.245 Terminal Capability Set message 6 in the transport connection. According to the proposed method, only if it has not received said message within a given time, for example because there is another MIK at the CS end, does the MIK send an H.245 Terminal Capability Set in which it specifies the voice codecs and video codecs sent in message 3.

6. The MIK contains an H.245 Terminal Capability Set message in the transport connection. Said message contains details about the capabilities of the terminal at the CS network end, inter alia about the supported video codecs (MP4V-ES and H.261 in the example) and voice codecs (G.711 and AMR in the example). The MIK compares the codecs received in message 5 with the codecs sent in message 3. If only one video codec and one voice codec were selected in each case in message 3, and said codecs were contained in message 6, the MIK continues directly with step 9 (in the example the video codec H.263 sent in message 3 is not contained in message 5).

7. The MIK compares the codecs received in message 6 with the codecs sent in message 1. The MIK selects one voice and video codec in each case from the intersection of the codecs in messages 6 and 1. According to the proposed method the MIK sends said codecs in an SDP offer message within a suitable SIP message, for example a re-INVITE or an UPDATE message.

8. If the MIK sent message 7, it again receives an SDP answer within an SIP message. In the SDP answer the IMS terminal must acknowledge the selection of codecs from message 6. The IMS terminal will accept these codecs as it has already offered them itself in message 1.

9. If message 5 was not sent, the MIK forwards the voice and video codecs sent in message 7, or in message 3 if steps 7 and 8 were skipped, as well as the details of the codec configuration by an H.245 Terminal Capability Set message. If message 5 and message 7 were sent and the codecs contained therein differ, the MIK likewise sends an H.245 Terminal Capability Set message and specifies therein the codecs contained in message 7.

10. The so-called H.245 master-slave determination, i.e. the determination of the master or slave terminal, is performed. The master-slave determination messages can also have already been sent together with the Terminal Capability Set messages 6 and 5 or 9 respectively. The master-slave determination is only relevant for resolving a resource conflict and therefore will not be considered further. Using H.245, so-called logical channels of the H.223 Protocol are then opened for transmitting the voice and video. The voice codecs and video codecs already selected in message 5 or 9 respectively are used here.

Figure 4:
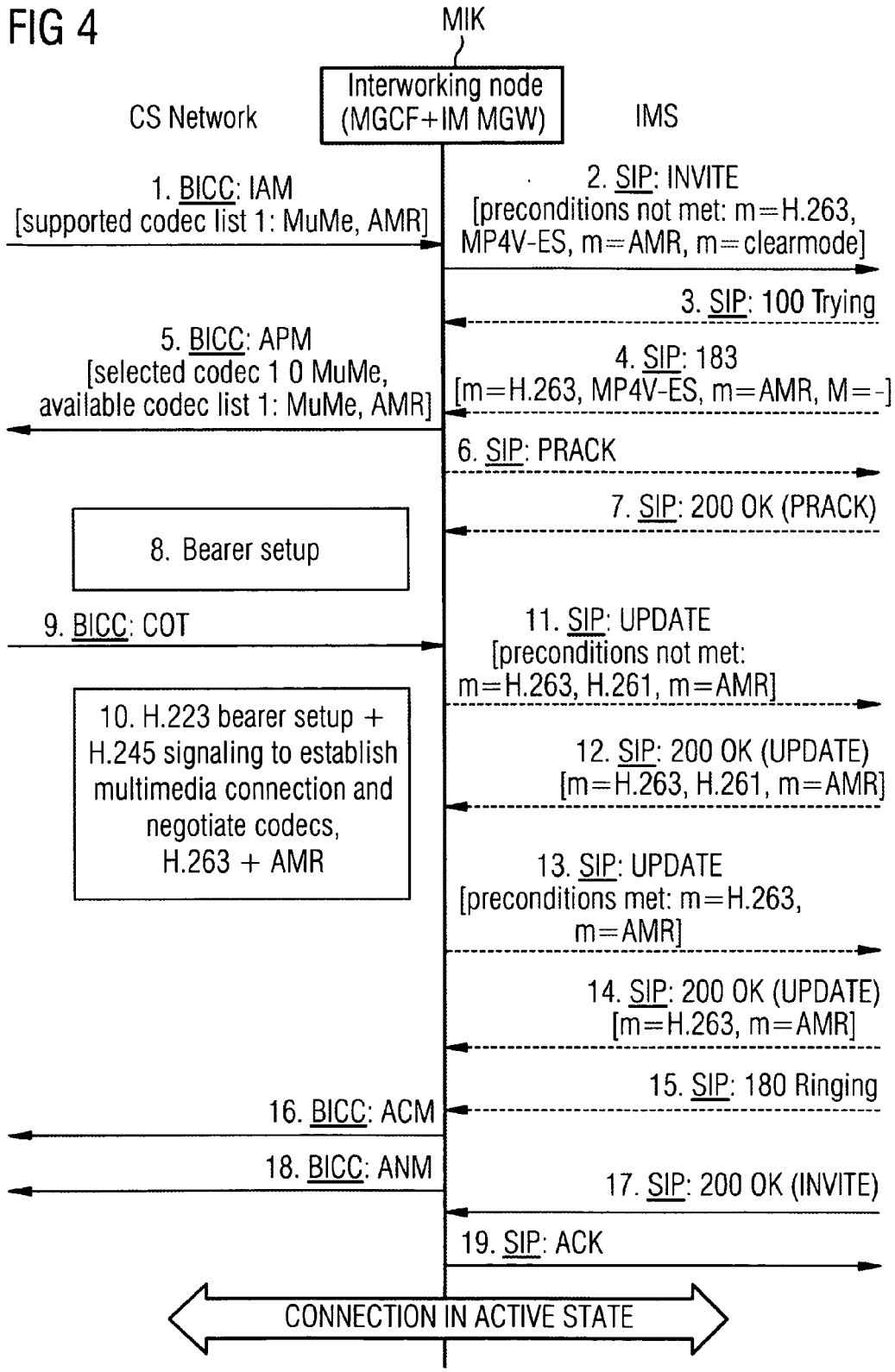

FIG. 4 represents with the aid of the signaling sequence the interworking between the BICC signaling at the CS end and the SIP/SDP call control signaling at the IMS end by a multimedia interworking node (MIK) in the case of an IMS-terminating call establishment. The MIK may comprise MGCF and IM-MGW for example. "Service Change and UDI Fallback" (SCUDIF) according to 3GPP TS 23.172 is used in the CS network. It is assumed that the CS network is configured in such a way that it supports so-called forward early media, that is to say forwards payload data already sent by the caller before the BICC "ANM" message. At the IMS end the SIP "Preconditions" (IETF RFC 3312), "Update" (IETF RFC 3311) and "100rel" (IETF RFC 3262) extensions are used. It is assumed that the IMS terminal supports and accepts video telephony.

In detail, the signaling steps are as follows:

1. The MIK receives a so-called "IAM" message from the CS end. In accordance with SCUDIF signaling, said message contains a codec list that specifies the codecs to be used for voice telephony as well as a so-called "MuMe" dummy codec as placeholder for video telephony, which indicates only that video telephony according to H.324M is supported, but not which voice codecs and video codecs are supported in this case. Since the MuMe codec is the first codec in the codec list, it is preferred at the CS end, i.e. video telephony is desired.

2. The MIK converts the IAM message into an SIP INVITE message, in the SDP offer contained therein the MIK provides details about the voice codecs (AMR in the example) and video codecs (H.263 and MP4V-ES in the example) that will probably be supported at the CS end for the H.324 video telephony, as already described for step 2 in FIG. 2. To ensure a smooth call establishment even in the case where voice telephony is selected at the IMS end, the MIK should also specify the voice codecs contained in message 1 as a less preferred alternative. The MIK uses the SIP preconditions extension to indicate that establishment of the transport connection is required locally before the call establishment can be completed. This is expedient to avoid so-called clipping, that is to say a loss of voice or video sent by the called party before a through transport connection is present.

3. An SIP "Trying" message acknowledges the INVITE message.

4. The MIK receives from the IMS end an SIP "183" message containing the SDP answer. The SDP answer contains the codecs from the list offered in message 2 that are supported and desired by the terminal at the IMS end. The MIK detects from this that video codec(s) are contained, that video telephony is desired, and proceeds as described in detail for message 5 in FIG. 2.

5. The MIK sends a BICC "APM" message containing as a so-called "available codec list" the MuMe codec as well as the voice codecs that were contained both in message 1 and in message 4. The MuMe codec is specified as "selected codec". The MIK thus removes from message 4 voice codecs that are only possible for video telephony using H.324M in order to comply with the rules of out-of-band BICC codec negotiation.

6. In accordance with the SIP 100rel extension, the MIK acknowledges reception of the 183 message with an SIP "PRACK" message.

7. The SIP PRACK message is acknowledged.

8. The transport connection is established at the CS network end.

9. If the so-called "continuity check" procedure is used at the CS network end, the MIK receives a so-called BICC "COT" message.

10. The in-band negotiation of the H.223 multiplexer level as well as the H.245 negotiation described in FIG. 2 are performed via the transport connection of the CS network.

11. and 12. As described in FIG. 2 for messages 7 and 8, during the H.245 negotiation an SDP offer and answer may be sent. It is transported using an SIP UPDATE message (IETF RFC 3311).

13. Following completion of the H.245 in-band negotiation, the MIK signals with the aid of the SIP preconditions extension that the local establishment of the transport connection has been completed. The message can be combined with message 11 from FIG. 2 if necessary. An SIP UPDATE message is used to transport the corresponding SDP.

14. The SIP UPDATE message is acknowledged.

15. An SIP "Ringing" message is received.

16. The information from message 15 is forwarded as an "ACM" message.

17. The called subscriber accepts the call. The MIK receives an SIP "200 OK(INVITE)" message.

18. The information from message 17 is forwarded as an ANM message.

19. The SIP 200 OK(INVITE) is acknowledged.

Figure 5:
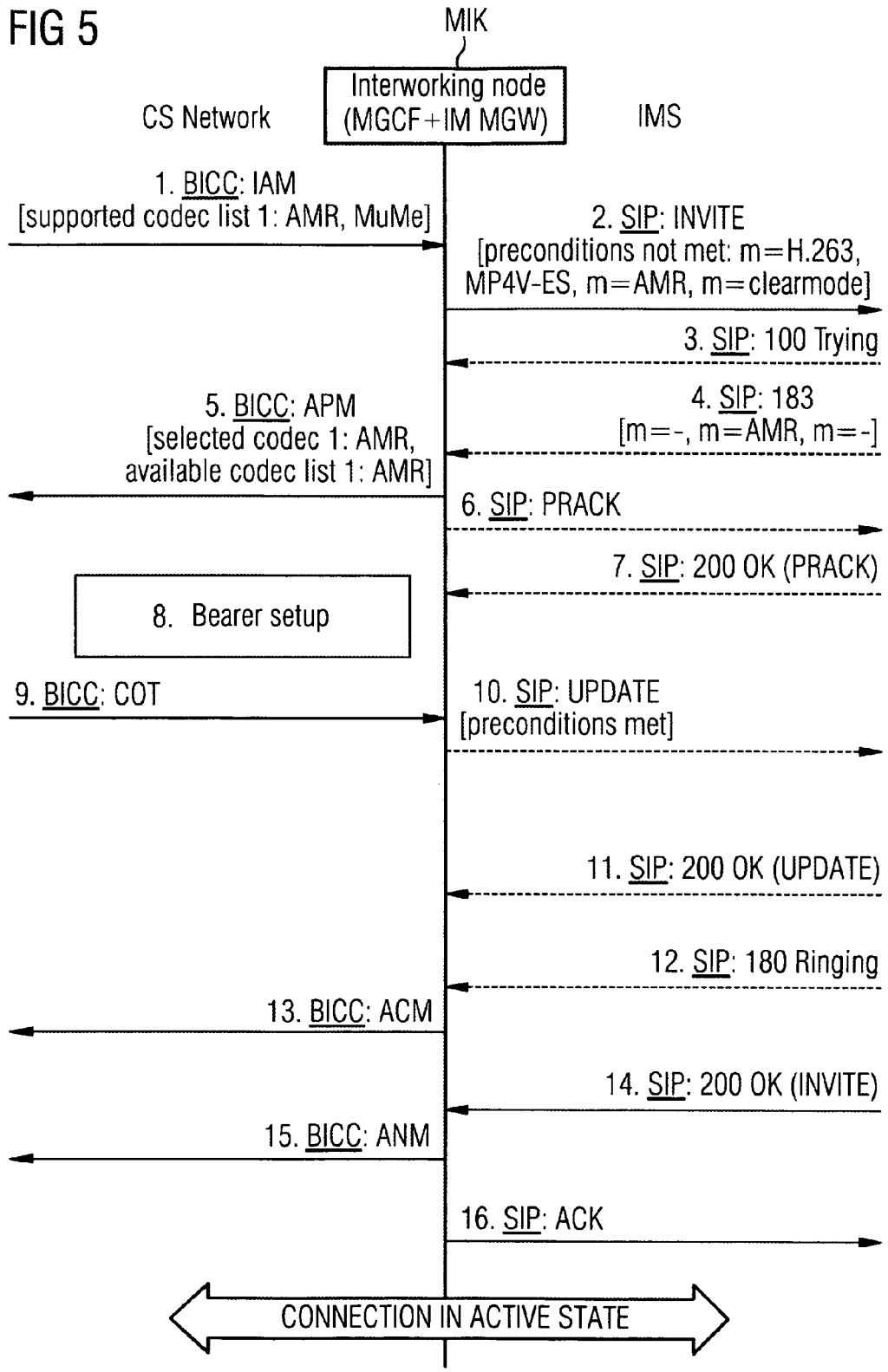

FIG. 5 represents with the aid of the signaling sequence the interworking between the BICC signaling at the CS end and the SIP/SDP call control signaling at the IMS end by a multimedia interworking node (MIK) in the case of an IMS-terminating call establishment. The MIK may comprise MGCF and IM-MGW for example. "Service Change and UDI Fallback" (SCUDIF) according to 3GPP TS 23.172 is used in the CS network. At the IMS end the SIP "Preconditions" (IETF RFC 3312), "Update" (IETF RFC 3311) and "100rel" (IETF RFC 3262) extensions are used. It is assumed that the IMS terminal supports only voice telephony.

In detail, the signaling steps are as follows:
1. to 3. As described in FIG. 4.
4. The MIK receives from the IMS end an SIP "183" message containing the SDP answer. The SDP answer contains the codecs from the list offered in message 2 that are supported and desired by the terminal at the IMS end. The MIK detects that voice telephony is desired because it contains only voice codec(s).
5. The MIK sends a BICC APM message containing the voice codecs that were contained both in message 1 and in message 4 as a so-called "available codec list". A voice codec is specified as "selected codec". The MIK thus removes from message 4 voice codecs that are only possible for video telephony using H.324M in order to comply with the rules of out-of-band BICC codec negotiation.
6. to 16. Call establishment progresses as described in TS 29.163.

Figure 6:
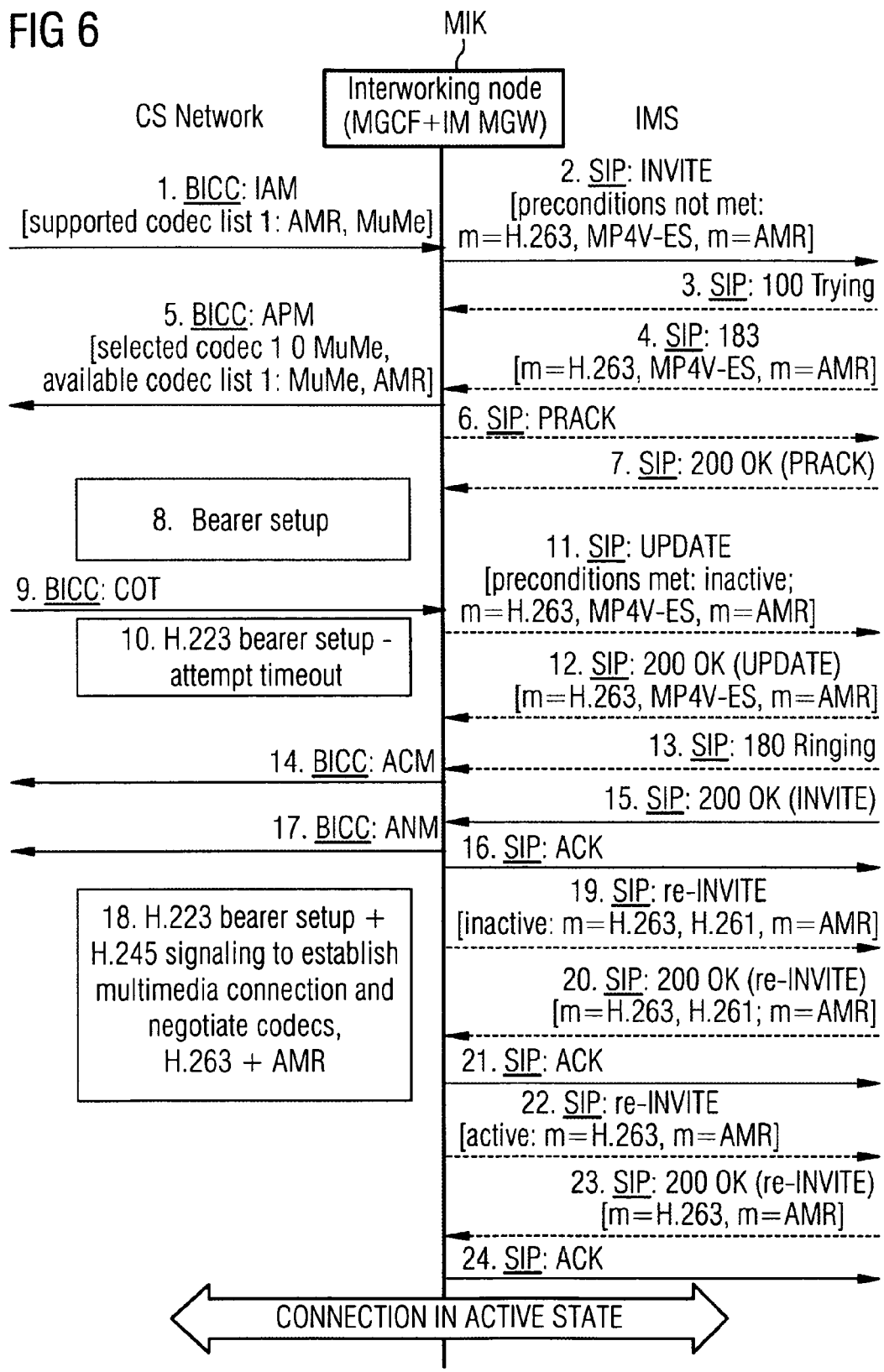

FIG. 6 represents with the aid of the signaling sequence the interworking between the BICC signaling at the CS end and the SIP/SDP call control signaling at the IMS end by a multimedia interworking node (MIK) in the case of an IMS-terminating call establishment. The MIK may comprise MGCF and IM-MGW for example. "Service Change and UDI Fallback" (SCUDIF) according to 3GPP TS 23.172 is used in the CS network. It is assumed that the CS network is configured in such a way that it does not support so-called forward early media, that is to say does not forward payload data sent by the caller before the BICC ANM message. At the IMS end the SIP "Preconditions" (IETF RFC 3312), "Update" (IETF RFC 3311) and "100rel" (IETF RFC 3262) extensions are used. It is assumed that the IMS terminal supports and accepts video telephony.

In detail, the signaling steps are as follows:
1. to 9. As described in FIG. 4.
10. If the MIK already knows from configuration that forward early media are not supported at the CS network end, it skips this step. Otherwise it waits for a given time to receive H.223 signaling in the transport connection in order to negotiate H.223 multiplexer levels. The proposed method then determines that forward early media are not supported and continues as described below.
11. To continue the call establishment, the MIK signals with the aid of the preconditions extension that the local establishment of the transport connection has been completed. To avoid clipping, that is to say a loss of voice or video sent by the called party before a through transport connection is present, it is expedient if the MIK sets the media in the SDP as described in RFC 3264 to "hold", for instance by assigning the so-called "inactive" attribute. An SIP UPDATE message is used to transport the corresponding SDP.
12. The SIP UPDATE message is acknowledged.
13. An SIP "Ringing" message is received.
14. The information from message 13 is forwarded as an ACM message.
15. The called subscriber accepts the call. The MIK receives an SIP 200 OK(INVITE) message.
16. The SIP 200 OK(INVITE) message is acknowledged.
17. The information from message 15 is forwarded as an ANM message.
18. The in-band negotiation of the H.223 multiplexer level as well as the H.245 negotiation described in FIG. 2 are performed via the transport connection of the CS network.
19. to 20. As described in FIG. 2 for messages 7 and 8, during the H.245 negotiation an SDP offer and answer may be sent. It is transported using an SIP re-INVITE message.
21. The SIP 200 OK(INVITE) 20 is acknowledged.
22. If the MIK set the media in message 11 to "hold", following completion of the H.245 in-band negotiation it reactivates them, as described in RFC 3264, for instance by sending SDP without the "inactive" attribute. The message can be combined with message 11 from FIG. 2 if necessary. An SIP re-INVITE message is used to transport the corresponding SDP.
23. The SIP re-INVITE message is acknowledged.
24. The SIP 200 OK(INVITE) 23 is acknowledged.

Figure 7:
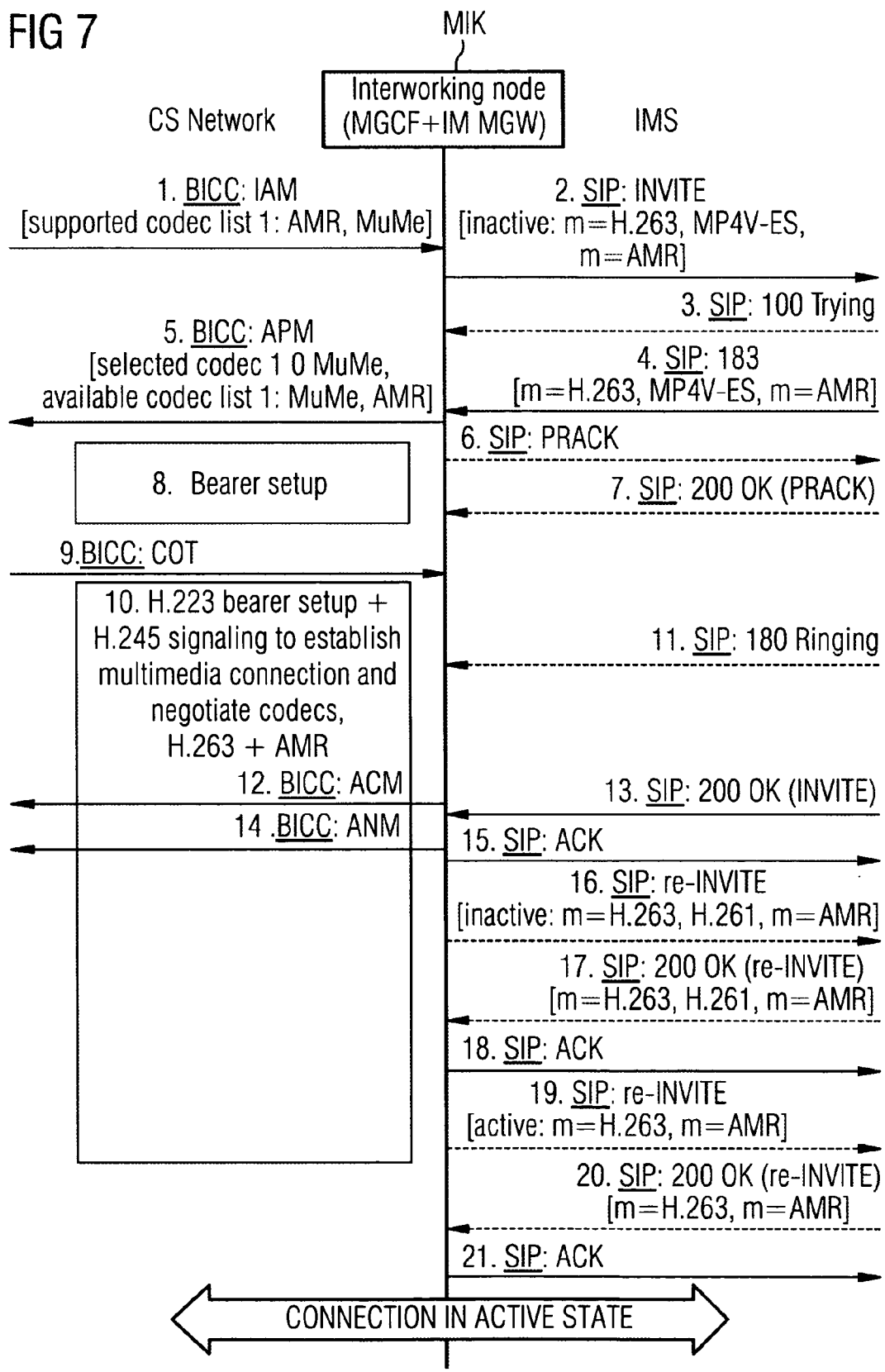

FIG. 7 represents with the aid of the signaling sequence the interworking between the BICC signaling and at the CS end and the SIP/SDP call control signaling at the IMS end by a multimedia interworking node (MIK) in the case of an IMS-terminating call establishment. The MIK may comprise MGCF and IM-MGW for example. "Service Change and UDI Fallback" (SCUDIF) according to 3GPP TS 23.172 is used in the CS network. At the IMS end the SIP "Preconditions" (IETF RFC 3312) and "Update" (IETF RFC 3311) extensions are not used, but the SIP "100rel" (IETF RFC 3262) extensions are used. It is assumed that the IMS terminal supports and accepts video telephony.

In detail, the signaling steps are as follows:
1. As in FIG. 4.
2. The MIK converts the IAM message into an SIP INVITE message. In the SDP offer contained therein the MIK provides details about the voice codecs (AMR in the example) and video codecs (H.263 and MP4V-ES in the example) that will probably be supported at the CS end for the H.324 video telephony, as already described for step 2 in FIG. 2. To ensure a smooth call establishment even in the case where voice telephony is selected at the IMS end, the MIK should also specify the voice codecs contained in message 1 as a less preferred alternative. To avoid clipping, that is to say a loss of voice or video sent by the called party before a through transport connection is present, it is expedient if the MIK sets the media in the SDP as described in RFC 3264 to "hold", for instance by assigning the so-called "inactive" attribute.
3. to 10. As in FIG. 4.
11. to 15. As messages 15 to 19 in FIG. 4.
16. to 17. As described in FIG. 2 for messages 7 and 8, during the H.245 negotiation an SDP offer and answer may be sent. It is transported using an SIP re-INVITE message.
18. The SIP 200 OK(INVITE) message is acknowledged.
19. If the MIK set the media in message 2 to "hold", following completion of the H.245 in-band negotiation it reactivates them, as described in RFC 3264, for instance by sending SDP without the "inactive" attribute. The message can be combined with message 11 from FIG. 2 if necessary. An SIP re-INVITE message is used to transport the corresponding SDP.
20. The SIP re-INVITE message is acknowledged.
21. The SIP 200 OK(INVITE) message is acknowledged.

Figure 8:
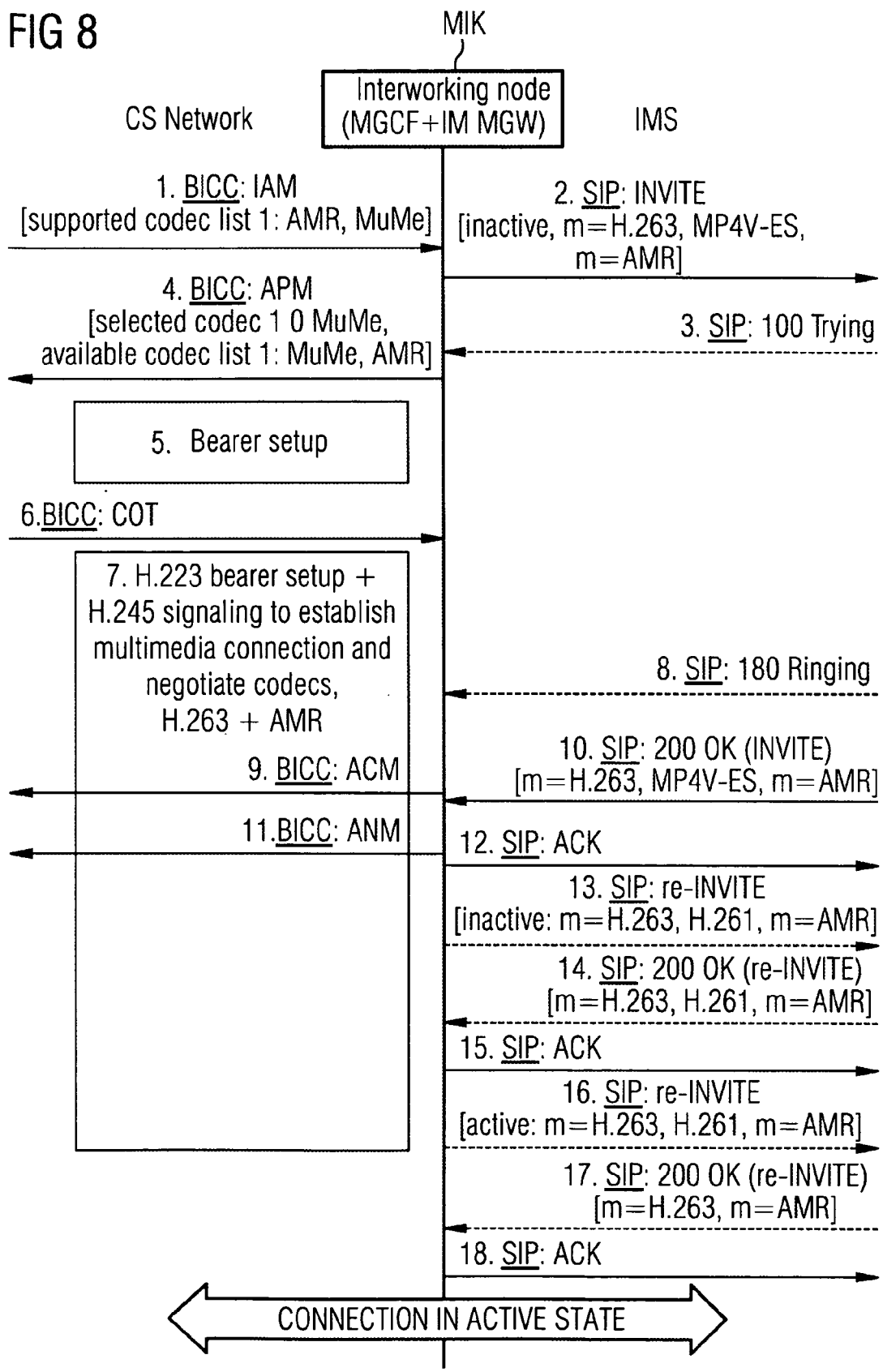

FIG. 8 represents with the aid of the signaling sequence the interworking between the BICC signaling at the CS end and the SIP/SDP call control signaling at the IMS end by a multimedia interworking node (MIK) in the case of an IMS-terminating call establishment. The MIK may comprise MGCF and IM-MGW for example. "Service Change and UDI Fallback" (SCUDIF) according to 3GPP TS 23.172 is used in the CS network. At the IMS end the SIP "Preconditions" (IETF RFC 3312), "Update" (IETF RFC 3311) and "100rel" (IETF RFC 3262) extensions are not used. It is assumed that the IMS terminal supports and accepts video telephony.

In detail, the signaling steps are as follows:
1. to 3. As in FIG. 7.
4. To continue call establishment, the MIK send a BICC APM message. The MIK still does not know at this time whether video telephony is accepted at the IMS end and which codecs are supported. The MIK assumes that video telephony is accepted and selects from the list contained in message 1 voice codecs that are probably supported at the IMS end, for example the AMR codec. The MIK inserts these voice codecs and the MuMe codec into the so-called available codec list. The MuMe codec is specified as "selected codec".
5. to 9. As messages 8 to 12 in FIG. 7.
10. The MIK receives from the IMS end an SIP 200 OK(INVITE) message containing the SDP answer. The SDP answer contains the codecs from the list offered in message 2 that are supported and desired by the terminal at the IMS end. The MIK detects from this that video codec(s) are contained, that video telephony is desired, and proceeds as described in detail for message 5 in FIG. 2.
11. to 18. As messages 14 to 21 in FIG. 7.

Figure 9:
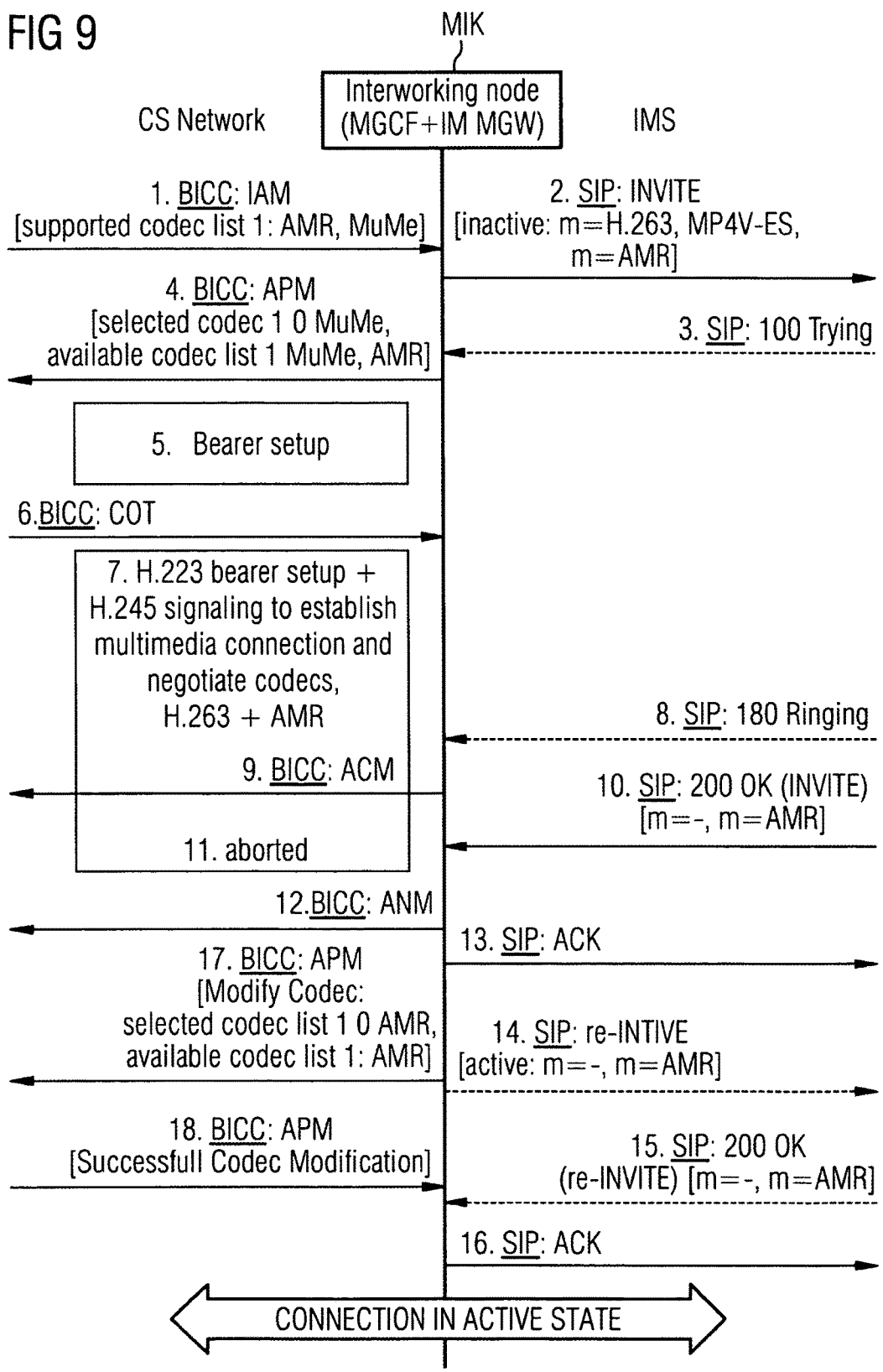

FIG. 9 represents with the aid of the signaling sequence the interworking between the BICC signaling at the CS end and the SIP/SDP call control signaling at the IMS end by a multimedia interworking node (MIK) in the case of an IMS-terminating call establishment. The MIK may comprise MGCF and IM-MGW for example. "Service Change and UDI Fallback" (SCUDIF) according to 3GPP TS 23.172 is used in the CS network. At the IMS end the SIP "Preconditions" (IETF RFC 3312), "Update" (IETF RFC 3311) and "100rel" (IETF RFC 3262) extensions are not used. It is assumed that the IMS terminal supports only voice telephony.

In detail, the signaling steps are as follows:
1. to 9. As in FIG. 9.
10. The MIK receives from the IMS end an SIP 200 OK(INVITE) message containing the SDP answer. The SDP answer contains the codecs from the list offered in message 2 that are supported and desired by the terminal at the IMS end. The MIK detects from this that voice telephony is desired because it contains no video codec(s), only voice codecs.
11. The MIK terminates the H.223 and H.245 negotiation.
12. to 13. As messages 11 and 12 in FIG. 9.
14. If the MIK set the media in message 2 to "hold", following completion of the H.245 in-band negotiation it reactivates them, as described in RFC 3264, for instance by sending SDP without the "inactive" attribute. An SIP re-INVITE message is used to transport the corresponding SDP.
15. The SIP re-INVITE message is acknowledged.
16. The SIP 200 OK(INVITE) 15 is acknowledged.
17. to 18. The MIK uses the so-called BICC "codec modification" procedure to switch over to voice telephony at the CS network end.

Figure 10:
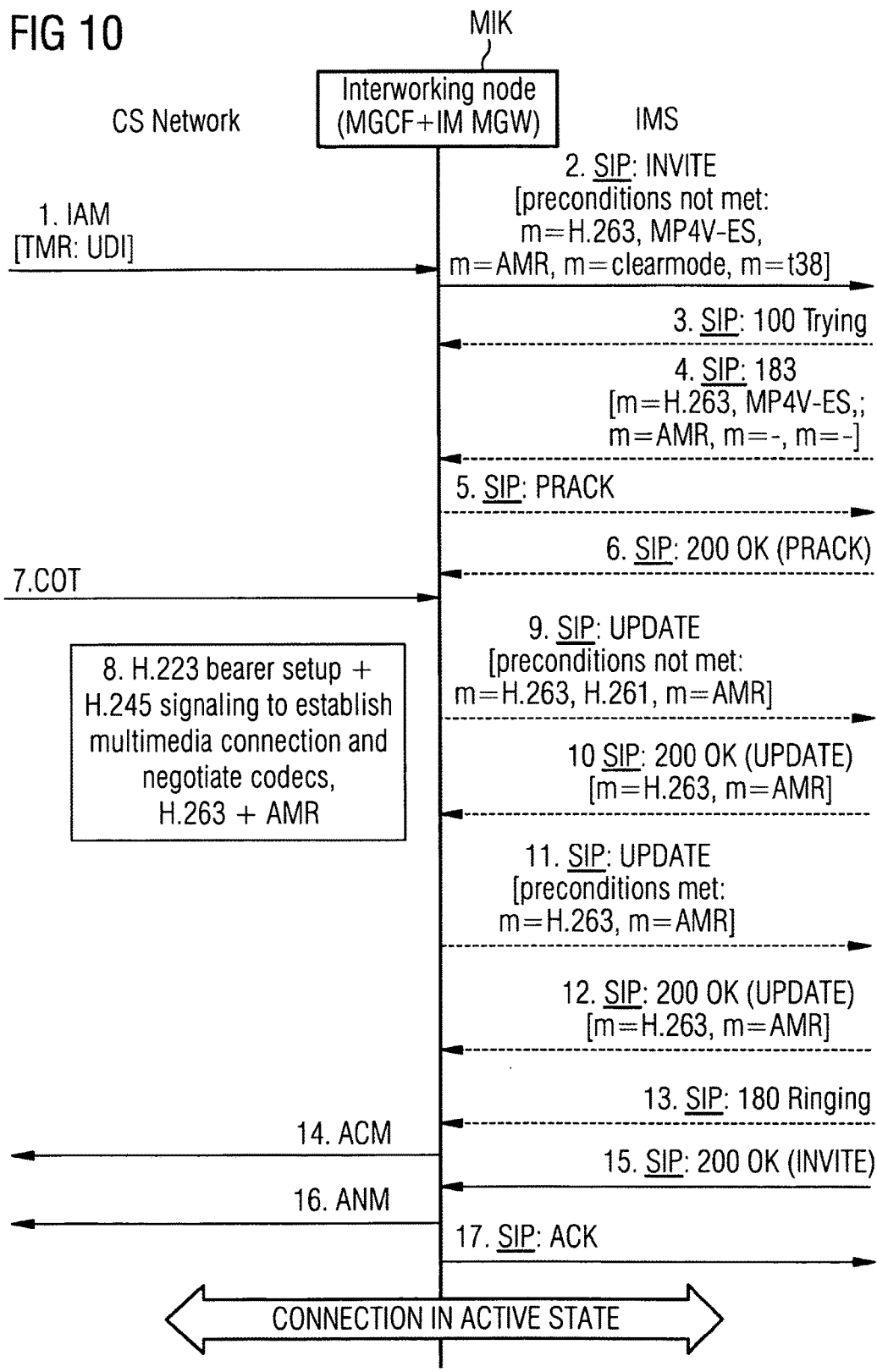

FIG. 10 represents with the aid of the signaling sequence the interworking between the ISUP signaling at the CS end and the SIP/SDP call control signaling at the IMS end by a multimedia interworking node (MIK) in the case of an IMS-terminating call establishment. The MIK may comprise MGCF and IM-MGW for example. It is assumed that the CS network is configured in such a way that it supports so-called forward early media, that is to say forwards payload data already sent by the caller before the BICC "ANM" message. At the IMS end the SIP "Preconditions" (IETF RFC 3312), "Update" (IETF RFC 3311) and "100rel" (IETF RFC 3262) extensions are used. It is assumed that the IMS terminal supports and accepts video telephony.

In detail, the signaling steps are as follows:
1. The MIK receives a so-called ISUP "IAM" message from the CS end and detects or infers that video telephony is desired on the basis of the signaled parameters, for example on the basis of the value "UDI" in the TMR parameter as well as appropriate values in the "USI" parameter.
2. The MIK converts the IAM message into an SIP INVITE message. In the SDP offer contained therein the MIK provides details about the voice codecs (AMR in the example) and video codecs (H.263 and MP4V-ES in the example) that will probably be supported at the CS end for the H.324 video telephony, as already described for step 2 in FIG. 2. The MIK uses the SIP preconditions extension to indicate that establishment of the transport connection is required locally before the call establishment can be completed. This is expedient to avoid so-called clipping, that is to say a loss of voice or video sent by the called party before a through transport connection is present.

In the case where the MIK cannot decide for certain whether video telephony or another data service is desired, the MIK can additionally insert codecs suitable for other data services, for example a FAX codec "t38" according to RFC 3362. If the called terminal supports only one particular data service, it will select the relevant data service. The caller may also have known that the terminal only supports this particular data service and sends this data service accordingly.
3. to 4. As in FIG. 4.
6. to 7. As messages 7 to 8 in FIG. 4.
7. to 17. As messages 9 to 19 in FIG. 4.

Figure 11:
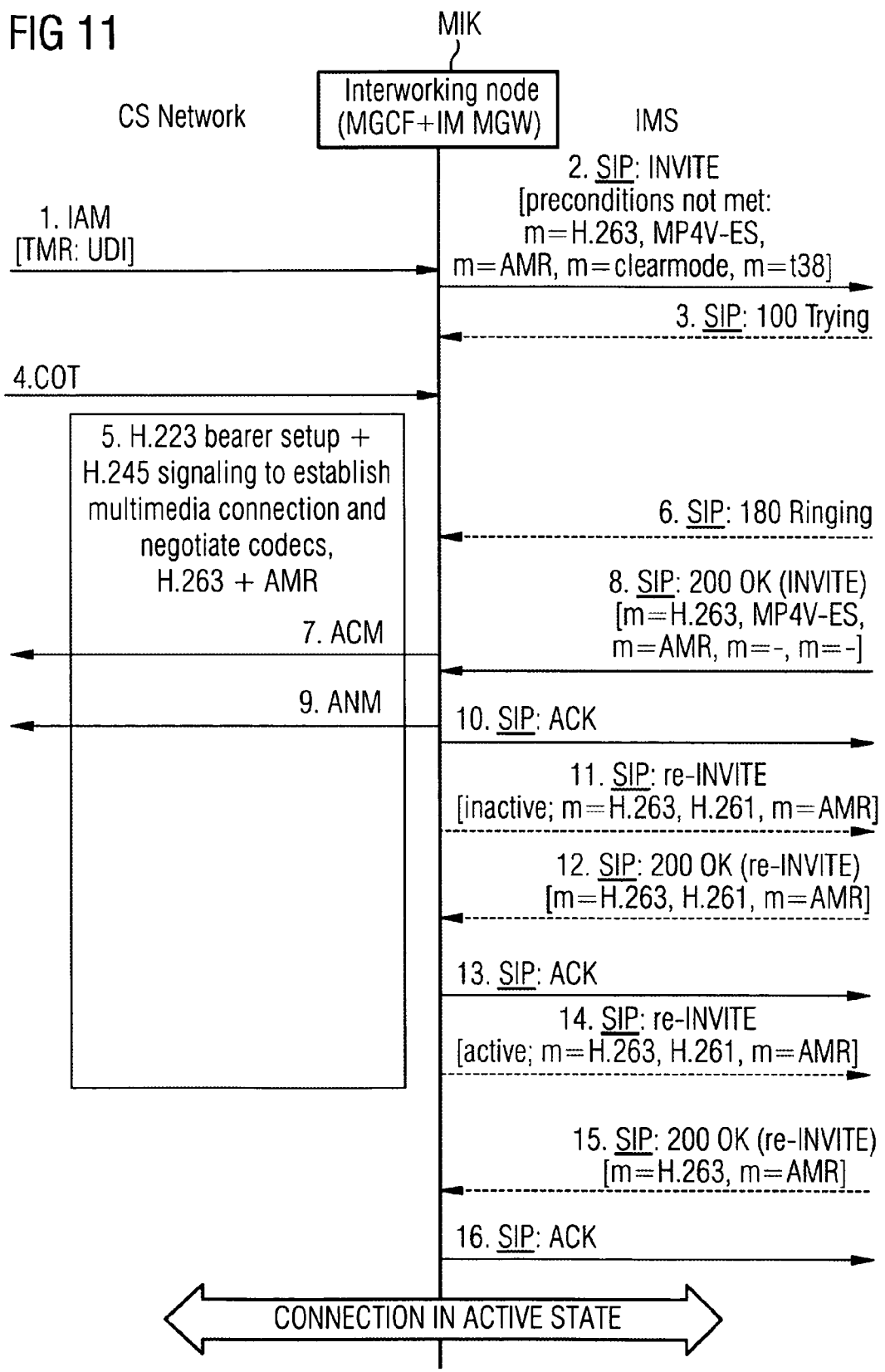

FIG. 11 represents with the aid of the signaling sequence the interworking between the SIP signaling at the CS end and the SIP/SDP call control signaling at the IMS end by a multimedia interworking node (MIK) in the case of an IMS-terminating call establishment. The MIK may comprise MGCF and IM-MGW for example. At the IMS end the SIP "Preconditions" (IETF RFC 3312), "Update" (IETF RFC 3311) and "100rel" (IETF RFC 3262) extensions are not used. It is assumed that the IMS terminal supports and accepts video telephony.

In detail, the signaling steps are as follows:
1. to 3. As in FIG. 10.
4. to 16. As messages 6 to 18 in FIG. 8.

Figure 12:
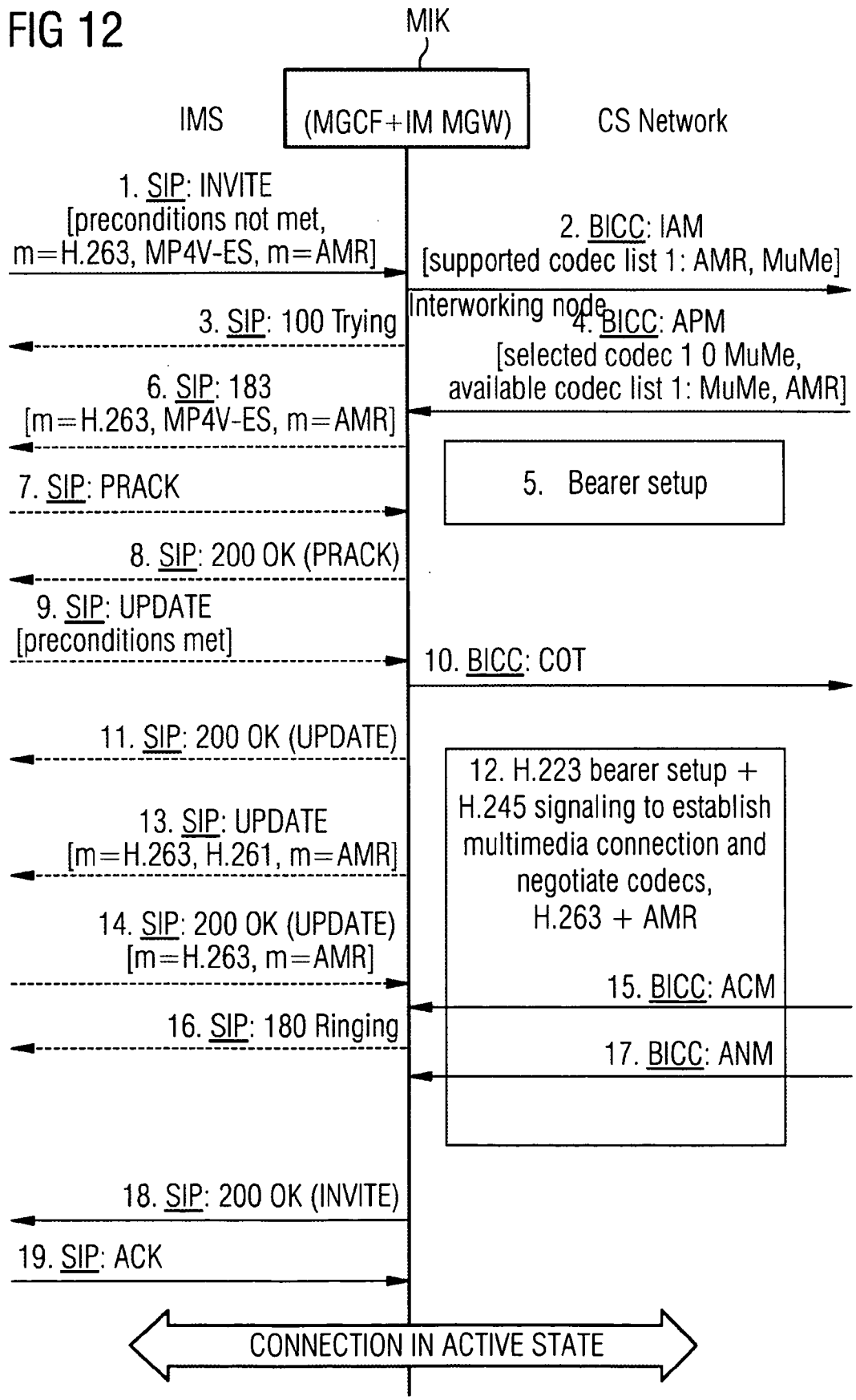

FIG. 12 represents with the aid of the signaling sequence the interworking between the BICC signaling at the CS end and the SIP/SDP call control signaling at the IMS end by a multimedia interworking node (MIK) in the case of an IMS-originating call establishment. The MIK may comprise MGCF and IM-MGW for example. "Service Change and UDI Fallback" (SCUDIF) according to 3GPP TS 23.172 is used in the CS network. At the IMS end the SIP "Preconditions" (IETF RFC 3312), "Update" (IETF RFC 3311) and "100rel" (IETF RFC 3262) extensions are used. It is assumed that the CS terminal supports and accepts video telephony.

In detail, the signaling steps are as follows:
1. The MIK receives a so-called SIP INVITE message containing an SDP offer. The SDP offer contains codecs which are supported by the terminal at the IMS end and which are desired for the call. The MIK detects from this that video codec(s) are contained, that video telephony is desired, and proceeds as described in detail for message 1 in FIG. 3.
2. The MIK sends a so-called "IAM" message to the CS end. In accordance with SCUDIF signaling, said message contains a codec list that specifies the codecs to be used for voice telephony as well as a so-called "MuMe" dummy codec as placeholder for video telephony, which indicates only that video telephony according to H.324M is supported, but not which voice codecs and video codecs are supported in this case. The MIK preferably selects the codecs contained in message 1 as voice codecs. The MIK inserts the MuMe codec into the codec list as the first codec to indicate that video telephony is desired.
3. An SIP "Trying" message acknowledges the INVITE message.
4. The MIK receives a BICC APM message in which the MuMe codec is specified as the so-called "selected codec". The MIK detects from this that the CS terminal also supports video telephony. The "available codec list" of the MuMe codec contains voice codecs that support the CS terminal for voice telephony.
5. The transport connection is established at the CS network end.
6. The MIK sends at the IMS end an SIP "183" message containing the SDP answer, as is described in detail for message 3 in FIG. 3.
7. In accordance with the SIP 100rel extension, the MIK receives a SIP PRACK message as an acknowledgment of the 183 message.
8. The SIP PRACK message is acknowledged.
9. The MIC receives an SIP UPDATE message which indicates with the aid of the SIP preconditions extension that the local establishment of the transport connection has been completed at the IMS terminal end.
10. If the so-called "continuity check" procedure is used at the CS network end, the MIK sends a so-called BICC "COT" message.
11. The SIP UPDATE message is acknowledged.
12. The in-band negotiation of the H.223 multiplexer level as well as the H.245 negotiation described in FIG. 3 are performed via the transport connection of the CS network.
13. and 14. As described in FIG. 3 for messages 7 and 8, during the H.245 negotiation an SDP offer and answer may be sent. It is transported using an SIP UPDATE message (IETF RFC 3311). If message 20 has already been sent at this time, an SIP re-INVITE message is used instead of the UPDATE message.
15. An "ACM" message is received.
16. The information from message 15 is forwarded as an SIP "Ringing" message.
17. The called subscriber accepts the call. The MIK receives an ANM message.
18. The information from message 17 is forwarded as an SIP 200 OK(INVITE) message.
19. The SIP 200 OK(INVITE) is acknowledged.

Figure 13:
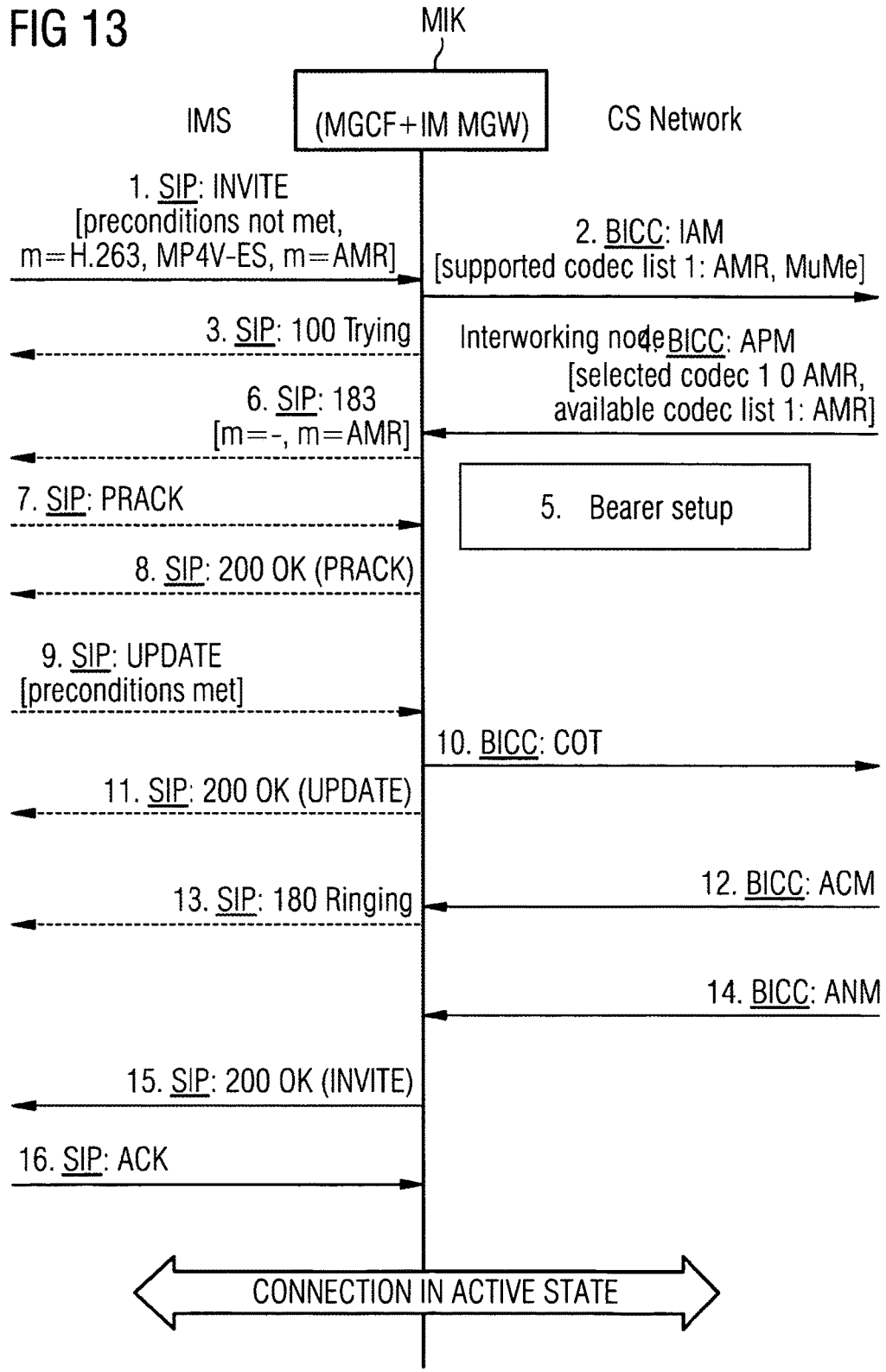

FIG. 13 represents with the aid of the signaling sequence the interworking between the BICC signaling at the CS end and the SIP/SDP call control signaling at the IMS end by a multimedia interworking node (MIK) in the case of an IMS-originating call establishment. The MIK may comprise MGCF and IM-MGW for example. "Service Change and UDI Fallback" (SCUDIF) according to 3GPP TS 23.172 is used in the CS network. At the IMS end the SIP "Preconditions" (IETF RFC 3312), "Update" (IETF RFC 3311) and "100rel" (IETF RFC 3262) extensions are used. It is assumed that the CS terminal supports and accepts only voice telephony.

In detail, the signaling steps are as follows:
1. to 3. As FIG. 12.
4. The MIK receives a BICC APM message in which the "available codec list" contains only voice codecs. The MIK detects from this that the CS terminal supports only voice telephony.
5. The transport connection is established at the CS network end.
6. The MIK sends at the IMS end an SIP 183 message containing the SDP answer for message 1. The MIK specifies only voice codecs therein.
7. to 16. Call establishment for voice telephony progresses as described in TS 29.163.

Figure 14:
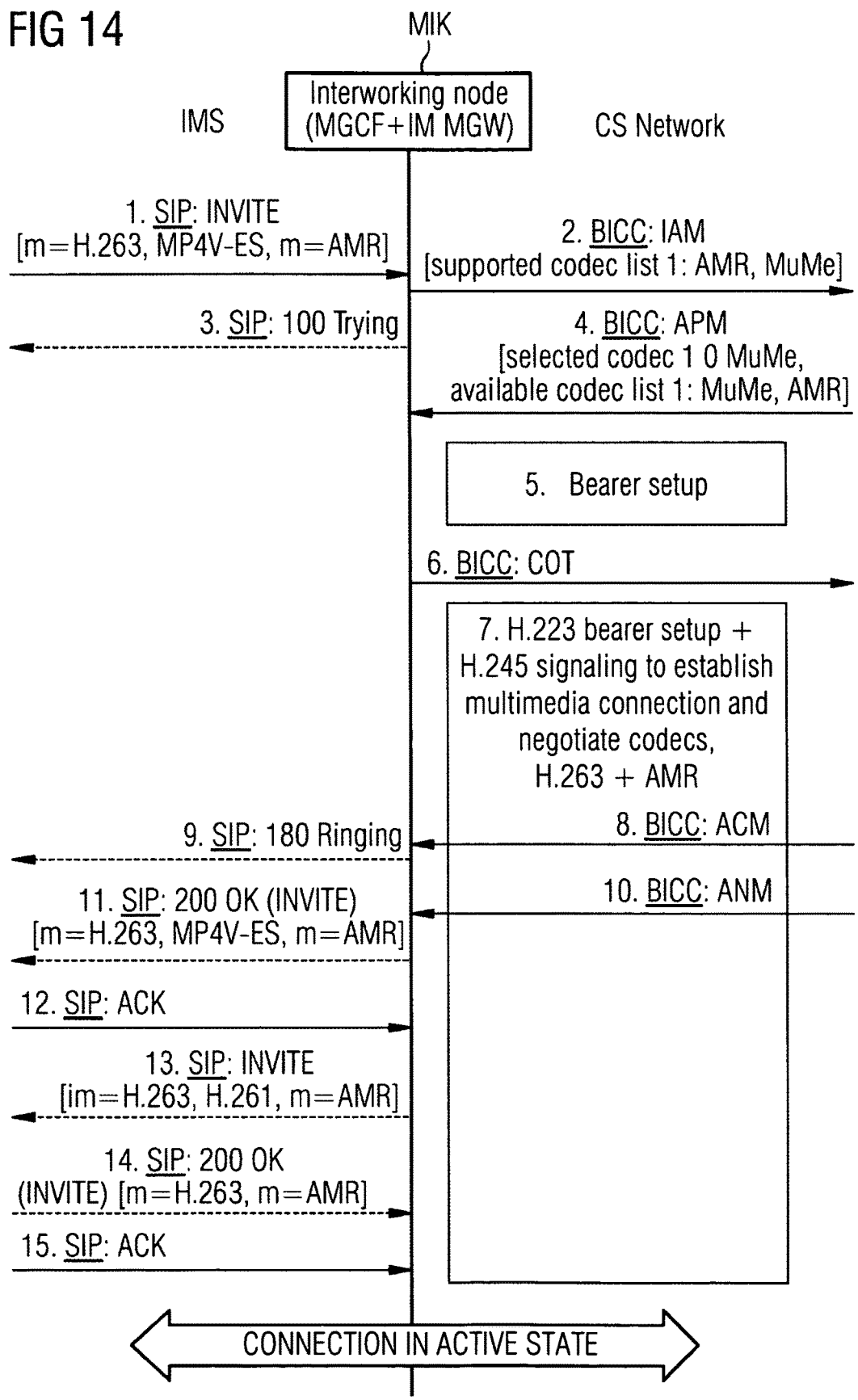

FIG. 14 represents with the aid of the signaling sequence the interworking between the BICC signaling at the CS end and the SIP/SDP call control signaling at the IMS end by a multimedia interworking node (MIK) in the case of an IMS-originating call establishment. The MIK may comprise MGCF and IM-MGW for example. "Service Change and UDI Fallback" (SCUDIF) according to 3GPP TS 23.172 is used in the CS network. At the IMS end the SIP "Preconditions" (IETF RFC 3312), "Update" (IETF RFC 3311) and "100rel" (IETF RFC 3262) extensions are not used. It is assumed that the CS terminal supports and accepts video telephony.

In detail, the signaling steps are as follows:
1. to 5. As FIG. 12.
6. If the so-called "continuity check" procedure is used at the CS network end, the MIK sends a so-called BICC "COT" message.
7. The in-band negotiation of the H.223 multiplexer level as well as the H.245 negotiation described in FIG. 3 are performed via the transport connection of the CS network.
8. An "ACM" message is received.
9. The information is forwarded as an SIP "Ringing" message.
10. The called subscriber accepts the call. The MIK receives an ANM message.
11. The MIK sends at the IMS end an SIP 200 OK(INVITE) message containing the SDP answer, as is described in detail for message 3 in FIG. 3.
12. The SIP 200 OK(INVITE) is acknowledged.
13. and 14. As described in FIG. 3 for messages 7 and 8, during the H.245 negotiation an SDP offer and answer may be sent. It is transported using an SIP re-INVITE message.
15. The SIP 200 OK(INVITE) is acknowledged.

FIG. 15 represents with the aid of the signaling sequence the interworking between the ISUP signaling at the CS end and the SIP/SDP call control signaling at the IMS end by a multimedia interworking node (MIK) in the case of an IMS-originating call establishment. The MIK may comprise MGCF and IM-MGW for example. At the IMS end the SIP "Preconditions" (IETF RFC 3312), "Update" (IETF RFC 3311) and "100rel" (IETF RFC 3262) extensions are used. It is assumed that the CS terminal supports and accepts video telephony.

In detail, the signaling steps are as follows:
1. As FIG. 12.
2. The MIK sends a so-called "IAM" message to the CS end. The MIK indicates in this that video telephony is desired, for example by selecting the value "UDI" for the TMR parameter and appropriate values in the "USI" parameter.
3. As FIG. 12.
4. to 17. As messages 6 to 19 in FIG. 12.

FIG. 16 represents with the aid of the signaling sequence the interworking between the ISUP signaling at the CS end and the SIP/SDP call control signaling at the IMS end by a multimedia interworking node (MIK) in the case of an IMS-originating call establishment. The MIK may comprise MGCF and IM-MGW for example. At the IMS end the SIP "Preconditions" (IETF RFC 3312), "Update" (IETF RFC 3311) and "100rel" (IETF RFC 3262) extensions are not used. It is assumed that the CS terminal supports and accepts video telephony.

In detail, the signaling steps are as follows:
1. As FIG. 14.
2. The MIK sends a so-called "IAM" message to the CS end. The MIK indicates in this that video telephony is desired, for example by selecting the value "UDI" for the TMR parameter and appropriate values in the "USI" parameter.
3. As FIG. 14.
4. to 13. As messages 6 to 15 in FIG. 14.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV,* 69 USPQ2d 1865 (Fed. Cir. 2004).

The invention claimed is:

1. A method for establishing a video telephone call and/or multimedia telephone call from a telephone network having a first terminal to an IP network based on the Internet Protocol having a second terminal, said method comprising:
receiving from the first terminal by an interworking node, a first call setup message according to a first signaling protocol used by the telephone network, the first call setup message not containing information about encoding methods supported by the first terminal;
sending by the interworking node towards the second terminal, a second call setup message of a second signaling protocol used by the IP network, the second call setup message indicating one or more first encoding methods likely to be supported by the first terminal for transmission of payload data exchanged during the video telephone call and/or multimedia telephone call;
receiving at the interworking node a first signaling message of a an H.245 protocol via a data connection set up in the telephone network for transmitting the payload data of the video telephone call and/or multimedia telephone call, the first signaling message of the third H.245 protocol containing information about one or more second encoding methods supported by the first terminal; and
comparing by the interworking node the second encoding methods contained in the H.245 first signaling message with the first encoding methods indicated in the second call setup message, and afterwards sending by the interworking node another call setup message indicating at least one third encoding method into the IP network toward the second terminal,
wherein the interworking node includes a Media Gateway Control Function (MGCF) node and an IMS Media Gateway (IM-MGW) node.

2. The method as claimed in claim 1, wherein the IP network is part of a 3RD Generation Partnership Project (3GPP) network.

3. The method as claimed in claim 1, wherein the telephone network is a circuit switched network and/or a Public Switched Telephone Network.

4. The method as claimed in claim 1, wherein the first signaling protocol is BICC and/or ISUP.

5. The method as claimed in claim 1, wherein the IP network is an IP Multimedia Subsystem (IMS) network.

6. The method as claimed in claim 1, wherein the second signaling protocol is a Session Initiation Protocol/Session Description Protocol SIP/SDP.

7. The method as claimed in claim 6, wherein the SIP/SDP protocol includes a preconditions extension, and the extension is used to signal completion of establishment of a transport connection in the telephone network.

8. The method as claimed in claim 1, wherein
the H.245 signaling protocol is H.324 family protocol, and
the data connection is established with the aid of the H.324 family protocol.

9. The method as claimed in claim 1, wherein the first encoding method is defined based on characteristics of the telephone network.

10. The method as claimed in claim 1, wherein the first encoding method is defined based on a call number of the first terminal.

11. The method as claimed in claim 1, wherein the first encoding method is an encoding method most probably used in both the telephone network and the IP network and is defined based on key characteristics of the telephone network and the IP network.

12. The method as claimed in claim 1, wherein the call setup message of the first signaling protocol contains information about voice encoding methods that can be used in the telephone network, and a voice encoding method is defined while defining the one or more estimated first, second and third encoding methods.

13. The method as claimed in claim 1, wherein a first specification message is transmitted in the telephone network which specifies one or more fourth encoding methods that can be used in the first terminal.

14. The method as claimed in claim 13, wherein the fourth encoding method specified in the first specification message is compared with the first, second and third encoding methods to produce a result.

15. The method as claimed in claim 14, wherein, when the result shows that there is either no match or only a partial match between the fourth encoding method specified in the first specification message and the first, second and third encoding methods, a second signaling message of the second signaling protocol is sent into the IP network to inform the IP network of the fourth encoding method specified in the first specification message.

16. The method as claimed in claim 1, wherein
a second signaling message of the second signaling protocol is transmitted in the IP network which specifies one or more fifth encoding methods that can be used in the second terminal, and
a second specification message is sent into the telephone network while establishing the data connection to inform the telephone network of the fifth encoding method that can be used in the second terminal.

17. The method as claimed in claim 13, wherein
a second signaling message of the second signaling protocol is transmitted in the IP network which specifies one or more sixth encoding methods that can be used in the second terminal,
a second specification message of the first signaling protocol is sent into the telephone network while establishing the data connection to inform the telephone network of the encoding method that can be used in the second terminal,
the second specification message is compared with the first specification message, and
establishment of the video telephone call and/or multimedia telephone call is terminated or a switchover to voice telephony is initiated when there is not at least one matching video telephony encoding method identified in the first and second specification messages.

18. The method as claimed in claim 1, wherein the first, second and third encoding methods comprise voice and video encoding methods.

19. The method as claimed in claim 18, wherein the first, second and third encoding methods further comprise data encoding method in addition to the voice and video encoding methods.

20. The method as claimed in claim 1, wherein the second terminal is instructed not to transmit any payload until a transport connection has been established in the telephone network as part of establishing the data connection.

21. An interworking node for establishing a video telephone call and/or multimedia telephone from a telephone network having a first terminal to an IP network based on the Internet Protocol having a second terminal, comprising:
one or more processors configured to execute a procedure including:
receiving from the first terminal by the interworking node, a first call setup message according to a first signaling protocol used by the telephone network, the call setup message not containing information about encoding methods supported by the first terminal;
sending by the interworking node, towards the second terminal a second call setup message of a second signaling protocol used by the IP network, the second call setup message indicating one or more first encoding methods likely to be supported by the first terminal for transmission of payload data exchanged during the video telephone call and/or multimedia telephone call;
receiving at the interworking node a first signaling message of an H.245 protocol via a data connection set up in the telephone network for transmitting the payload data of the video telephone call and/or multimedia telephone call, the first signaling message of the H.245 protocol containing information about one or more second encoding methods supported by the first terminal; and
comparing by the interworking node the second encoding methods contained in the H.245 first signaling message with the first encoding methods indicated in the second call setup message, and afterwards sending by the interworking node another call setup message indicating at least one third encoding method into the IP network toward the second terminal,
wherein the interworking node includes a Media Gateway Control Function (MGCF) node and an IMS Media Gateway (IM-MGW) node.

\* \* \* \* \*